United States Patent [19]
Senshu et al.

[11] Patent Number: 5,715,222
[45] Date of Patent: Feb. 3, 1998

[54] PLAYBACK CLOCK GENERATING CIRCUIT

[75] Inventors: Susumu Senshu; Tomohiro Koda, both of Kanagawa, Japan

[73] Assignee: Sony Corporation, Tokyo, Japan

[21] Appl. No.: 788,172

[22] Filed: Jan. 24, 1997

[30]  Foreign Application Priority Data

Jan. 31, 1996 [JP]  Japan .................. 8-016226

[51] Int. Cl.⁶ ........................................ G11B 7/00
[52] U.S. Cl. .................. 369/54; 369/59; 369/50; 369/47
[58] Field of Search .................. 369/54, 42, 48, 369/49, 50, 58, 59, 60, 32, 53

[56]  References Cited

U.S. PATENT DOCUMENTS 5,278,814  1/1994  Deguchi et al. .............. 369/50 X
5,619,484  4/1997  Yokota et al. ................. 369/50
5,636,196  6/1997  Kumagai ..................... 369/50 X

*Primary Examiner*—Muhammad N. Edun
*Attorney, Agent, or Firm*—Limbach & Limbach L.L.P.

[57]  ABSTRACT

A playback clock generating circuit whereby the effect of a local flaw may be diminished to enable high-precision clock reproduction. During reproduction of a reference area, a signal processor 2 calculates a phase error of the playback clocks CK by a clock generation processor 2A based on sampled values of the playback signals of the reference pattern A/D converted by an A/D converter 1. During reproduction of a data area, the signal processor sends a phase correction signal derived form the phase error to a clock generator 3 for correcting the phase of the playback clock CK generated by the clock generator 3.

33 Claims, 22 Drawing Sheets

PLAYBACK CLOCK GENERATING CIRCUIT

BACKGROUND OF THE INVENTION

1. Field of the Invention

This invention relates to a playback clock generating circuit used in a driving device for a magneto-optical disc of a sample-servo format.

2. Description of the Related Art

In general, in an optical disc system of the type in which various data are recorded and/r reproduced by scanning a concentric or spiral track with a laser beam, there are known a CLV system in which an optical disc is run at a constant linear velocity for recording/reproducing data, a CAV system in which an optical disc s run at a constant angular velocity for recording/reproducing data, and a modified CAV (MCAV) system in which the spatial recording density is maintained substantially constant at the inner and outer rims of the disc for raising the recording density. There are also known a continuous servo system in which tracking control is done using a pre-groove formed continuously along the track and a sampled servo system in which tracking control is done using a pre-groove formed discretely along the track.

Among known discs, there are a replay-only ROM disc, recordable discs, such as a write-once type disc or a magneto-optical disc (MO disc), and a so-called hybrid disc having both a ROM area and a RAM area.

In general, in a driving device for a magneto-optical disc of a sampled servo system in which a concentric or spiral track is divided into plural areas comprised of servo areas and data areas, external clocks are formed based on pits for clock reproduction formed in the servo areas so as to be used for data recording/reproduction. In the driving device in which data recording/reproduction is performed using the external clocks, phase error is sometimes produced between the phase of the playback data and the phase of the external clocks due to difference in the distance between the pits on the outer rim and those on the inner rim or to temperature characteristics. In order to prevent this from occurring, a reference pattern is recorded during data recording in a reference area of each sector header so as to be used at the time of reproduction for finding the phase error, that is the phase difference between the external clocks and the optimum playback clocks, and for supplying the phase difference thus produced to the external clocks so as to be used as playback clocks. For finding the phase error, the same circuitry as that used for of the data reproduction system is used. Since data of the data area and the reference pattern of the reference area are recorded under the same conditions, it is extremely effective to find the phase error using the reference pattern.

Among the methods for finding the phase error, there are a method for scanning the variable range for finding an optimum phase, and a method of performing a seizure operation and finding the phase difference at an assumed seizure time point, as disclosed in JP Patent Kokai JP-A-5-242608.

Meanwhile, in the above-described method for finding the optimum phase by scanning the variable range, the phase difference cannot be found correctly by a sole scanning operation unless the signal quality is particularly superior, so that it is necessary to perform several scanning operations in order to find an average value. To this end, the broader reference area needs to be set. In addition, phase points other than the optimum phase points are wasteful as the information.

On the other hand, the method of finding the phase difference at the assumed seizure time point is subject to effects of a flaw possibly present on the recording medium at the time point of completion of seizure since then the correct information cannot be obtained from the reference area.

OBJECTS AND SUMMARY OF THE INVENTION

It is therefore an object of the present invention to provide a playback clock generating circuit whereby the effect of local defects may be reduced for enabling high-precision clock reproduction.

It is another object of the present invention to provide a playback clock generating circuit whereby clocks may be generated highly accurately by effectively exploiting the information of the reference area.

In one aspect, the present invention provides a playback clock generating circuit for generating playback clocks for sampling used for sampling playback signals obtained from a recording medium of a sampled servo format having recorded therein a reference area for recording a reference pattern of a pre-set period. The playback clock generating circuit includes phase detection means for detecting the phase by performing rough detection based on sampled values of the playback signals of the reference pattern, phase seizing means for fine phase seizure based on the playback signal of the reference pattern after the phase detection by the phase detection means, and phase correction means for making the phase detection using an average phase over the seizing domain by the phase seizing means.

Preferably, the phase correction means corrects the phase using a phase error obtained on averaging average values, taken every phase seizing unit, over the entire reference area.

Preferably, the phase correction means corrects the phase by finding the phase error from the sum total of sums of set phases of respective phase seizing units over the reference area and the sum total of the number of times of setting of the respective phase seizing units over the reference area.

Preferably, the playback clock generating circuit further includes defect decision means for the playback signals of the reference pattern. The phase correction means finds the phase error by excluding the phase information of a defect domain based on the result of decision by the defect decision means.

Preferably, the phase correction means corrects the phase by finding the phase error by excluding the phase information of the defect domain every phase seizing unit based on the result of decision by the defect decision Preferably, the playback clock generating circuit further includes abnormality detection means for detecting the abnormality in the playback signal of the reference pattern, and control means for controlling the phase seizing operation by the phase seizing means responsive to the abnormality detection signal by the abnormality detection means.

Preferably, the control means manages control for stopping the phase seizing operation by the phase seizing means in the defect domain of the reference pattern playback signal based on the abnormality detection signal by the abnormality detection means.

Preferably, the control means manages control for reverting the phase seizing operation by the phase seizing means in the defect domain of the reference pattern playback signal to a pre-defect phase based on the abnormality detection signal by the abnormality detection means.

DESCRIPTION OF THE PREFERRED EMBODIMENTS

Figure 1:
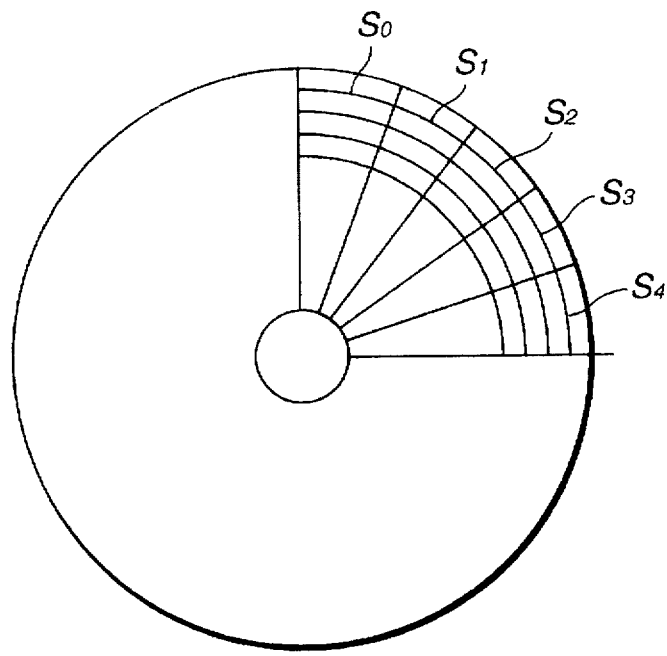
FIG. 1 schematically shows a magneto-optical disc of the sampled servo format having reference clocks recorded therein.

Referring to the drawings, preferred embodiments of the present invention will be explained in detail.

The playback clock generating circuit according to the present invention is configured for generating playback clocks for sampling playback signals obtained from a recording medium of a sampled servo format having a reference area having a reference pattern of a pre-set period recorded therein, and is applied to, for example, a driving device for a magneto-optical disc of the sampled servo format.

The magneto-optical disc of the sampled servo system for recording the reference pattern is now explained.

Figure 2:
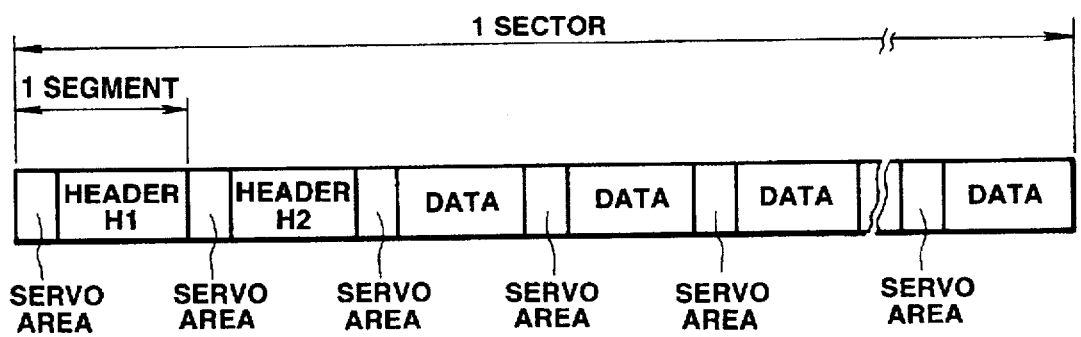
FIG. 2 shows the structure of a sector in a magneto-optical disc.

This sort of the magneto-optical disc has a concentric or spiral track T divided into plural sectors S so that data is recorded and/or reproduced in terms of sectors S0, S1, S2, ... as units, as shown in FIG. 1.. Each of the sectors S0, S1, S2, ... is further divided into plural segments, as shown in FIG. 2. Each segment is made up of a servo area and a data area.

In the servo area are formed two servo pits arrayed with an offset of n/4 pit from the track center. Clock reproduction and tracking control are performed based on the playback signals of the servo pits. Referring to FIG. 2, the leading segment of each sector is a header H1 having addresses and sector marks recorded therein as the control information for each sector, while the next segment is a header H2 for recording a reference pattern during data recording. In the header H2, that is the reference area, a reference pattern of 2T+2T is recorded at the time of data recording.

Figure 3:
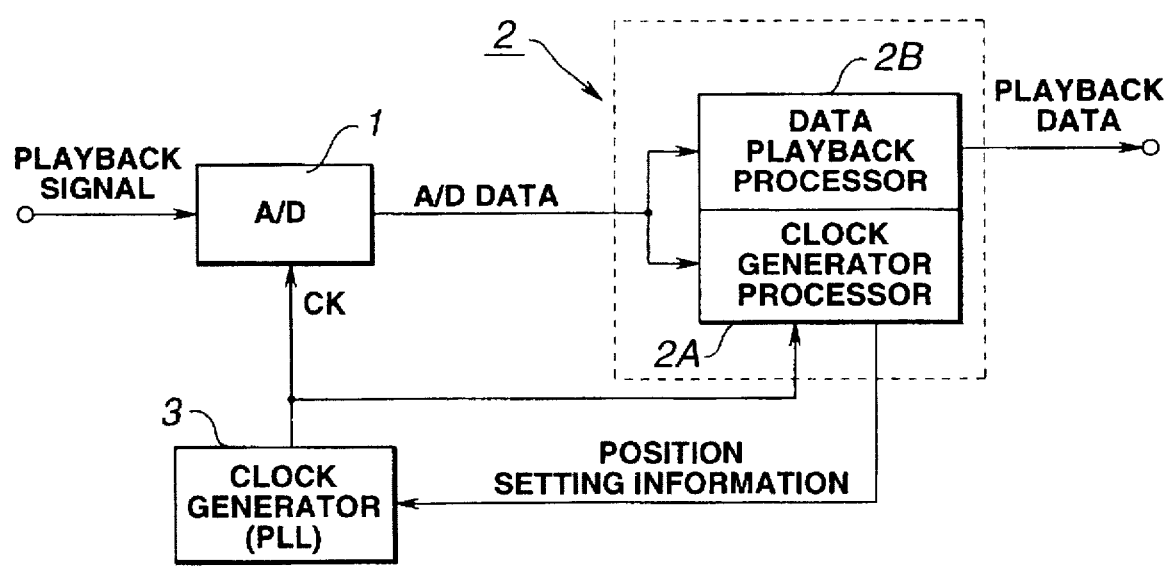
FIG. 3 is a bock diagram showing a basic structure of a playback clock generating circuit according to the present invention.

A playback clock generating circuit according to the present invention is configured as show for example in FIG. 3.

The playback clock generating circuit, shown in FIG. 3, is made up of a signal processor 2 fed with playback signals from the magneto-optical disc after A/D conversion by an A/D converter 1 and a clock generator 3 for supplying playback clocks CK to the A/D converter 1.

The A/D converter 1 samples the playback signals from the magneto-optical disc by playback clocks CK supplied from the clock generator 3 and A/D converts the sampled playback signals to produce sampled time-domain signals which are routed to the signal processor 2.

The signal processor 2 includes a clock generating processor 2A for performing signal processing for generating clocks based on the playback signal of the reference area and a data playback processor 2B for reproducing the data.

Figure 4:
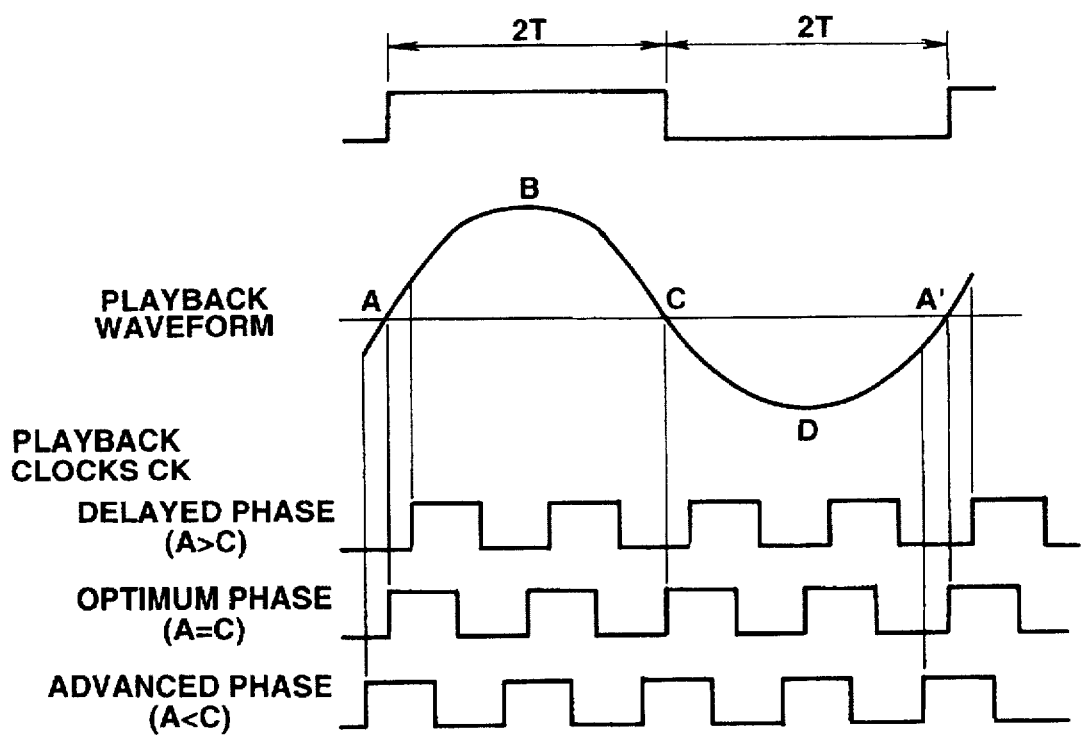
FIG. 4 is a waveform diagram for illustrating a phase seizure method of a playback clock generating circuit according to the present invention.

The clock generating processor 2A computes, at the time of reproduction of the reference area of the magneto-optical disc, the phase error of the playback clock CK based on the sampled value of the playback signal of the reference pattern obtained by A/D conversion by the A/D converter 1. Since the reference pattern recorded in the reference area of the magneto-optical disc is of 2T+2T or 4T period, the phase information is obtained as the difference (A–C) over the 2T period of the data obtained by sampling the playback signal by the A/D converter 1, that is the sampled value having the 2T period, as shown in FIG. 4. During reproduction of the data area of the magneto-optical disc, a phase correction signal is applied to the clock generator 3 based on the phase error calculated during reproduction of the reference area by the signal processor 2 for correcting the phase of the playback clock CK generated by the clock generator 3.

The clock generator 3 constitutes a phase locked loop along with the A/D converter 1 and the signal processor 2 and generates playback clocks CK phase-corrected with the phase correction signal derived from the phase error calculated at the time of reproduction of the reference area by the above-mentioned signal processor 2.

Thus, during reproduction of the data area, the A/D converter 1 samples the playback signal from the data area of the magneto-optical disc by the phase-corrected playback clocks CK to produce sampled time-domain signals which are routed to the signal processor 2.

Figure 5:
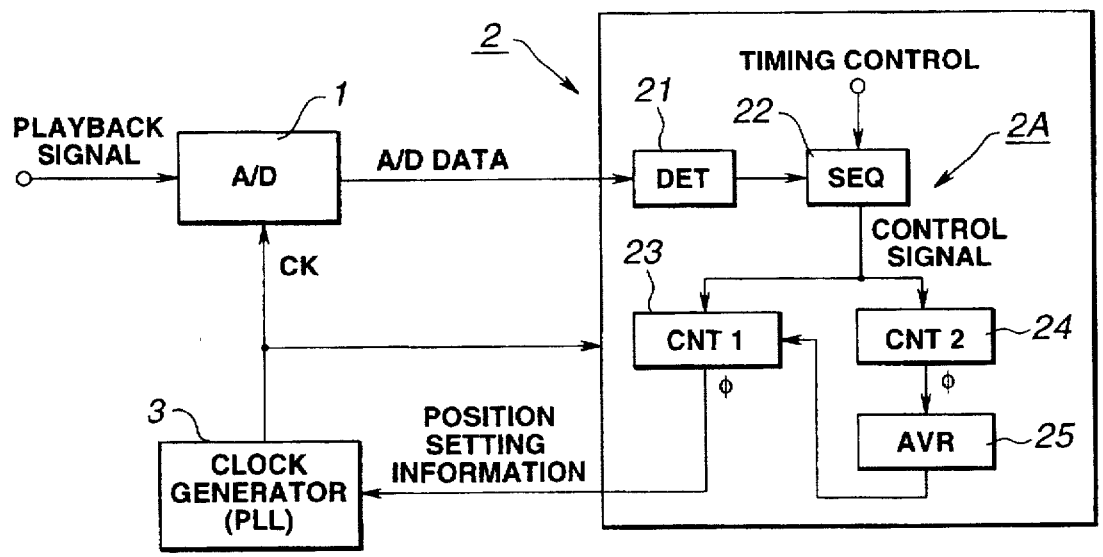
FIG. 5 is a block diagram showing essential portions of a playback clock generating circuit according to the present invention.

Referring to FIG. 5, the clock generating processor 2A includes a detector 21 supplied with sampling values specifying the signal level of the playback signals A/D converted by the A/D converter 1, and a controller 22 fed with an output of the detector 21. The clock generating processor 2A also includes first and second counters 23, 24 controlled by the controller 22, and an averaging circuit 24 fed with an output of the second counter 24.

The detector 21 generates, based on sampling data supplied from the A/D converter 1, sampling data comparison signals at each timing for the pattern or flaw detection information or the phase information used in the controller 22. The first counter 23 is a counter for phase setting for directly supplying the phase setting data to the clock generator 3 and is comprised of an up/down counter having a variable resolution. The second counter 24 is a phase setting counter for directly supplying the phase information to the averaging circuit 25 and is comprised of a binary counter. The averaging circuit 25 computes an average value of the phase information supplied from the second counter 24.

The controller 22 includes the following status registers and flipflops showing its inner states.

SRES: status register specifying the rough/fine of phase resolution.

This status register SRES goes high (H) and low (L) during rough detection and during fine phase seizure, respectively. This status register is reset if, during rough detection, the flipflop SDET is set by polarity reversion and the phase setting reverts to the rough detected phase.

SU_ D: status register specifying the increase/decrease of phase setting.

During the time of increase and decrease of the phase setting, the status register SU_ D is set to (H) and (L), respectively. During rough detection, the register SU_ D is reversed by detection of polarity inversion. For avoiding seizure to a point of 2T phase offset, the register SU_ D is reversed only on detection of polarity inversion from A<C to A>C during set phase increase, while being reversed only on detection of polarity inversion from A>C to A<C during set phase decrease. During fine seizure, the register is set to phase increase and to phase decrease for A<C and for A>C, respectively. This realizes a seizure operation.

SHLD: flipflop set when the maximum value in the range of detection is reached during phase increase or when the minium value in the range of detection is reached during phase decrease.

This flipflop SHLD specifies the state of phase holding, that is that the phase is not increased further. During the time the flipflop SHLD is set, the detected phase catches up with the stationary phase setting. The flipflop is reset when the detected phase has caught up with the phase setting.

SDET: flipflop set on polarity inversion duping rough detection.

During the time this flipflop SDET is set, the set phase is reverted. The flipflop SDET is reset when the set phase is reverted to the rough detected phase.

SRET: flipflop set after SHLD and SERR are reset, that is after the detected phase has caught up with the phase setting.

If the detected phase has caught up with the phase setting during the status of defect, but the status of the defect persists, the flipflop SERR is not cleared, so that the flipflop SRET is not set. When the detected phase information corresponding to the set phase started to be moved starts to be obtained, the flipflop SRET is reset. The flipflop is not in operation during fine seizure.

SERR: flipflop that is set when the defect exists.

FBC=BCNT: 2-bit counter.

This counter FBC=BCNT assumes the timing of periods A, B, C and D of an imaginary 2T+2T pattern playback waveform of the phase setting.

FHC=HCNT: counter for the time difference (time lag) as from phase setting until detection and re-setting.

This counter FHC=HCNT usually counts the phase step difference between the phase setting and the detected phase. Thus, if the detected phase is reverted to the set phase during SHLD or SEPR, reversion occurs until the count value is equal to 0. If, during SRET, for waiting until the detected phase information corresponding to the set phase started to be moved starts to be obtained, it suffices to count the time difference (time lag) as from the phase setting until detection and re-setting. If polarity inversion occurs during rough detection, that is if SDET is set, the counter is used for reverting the set phase up to the detected phase. With the SRET at the time point of transition to the fine seizure, the counter is used for reverting the detected phase to the set phase (rough detected phase). If, during fine seizure, the detected phase is reverted to the set phase during SHLD or SEPR, the reversion is made until the count value becomes equal to 0. Subsequently, during fine seizing operation, SRET is unnecessary and it suffices if the usual seizure operation is re-started. This counter FHC=HCNT counts the time difference (time lag) as from phase setting up to detection and re-setting. By so doing, the detected phase can be reverted to the set phase if SHLD or SERR has occurred a second time.

WINSCH: phase information detection window

This phase information detection window WINSCH is a signal set on detection of a polarity inversion detection signal snch within A and C timing signals win of the 2T+2T pattern playback waveform (sine wave with a period of 4T).

CDIS: a signal which is issued by a phase setting counter CNT1 for advising that the setting limit of the detection range is reached.

Figure 6:
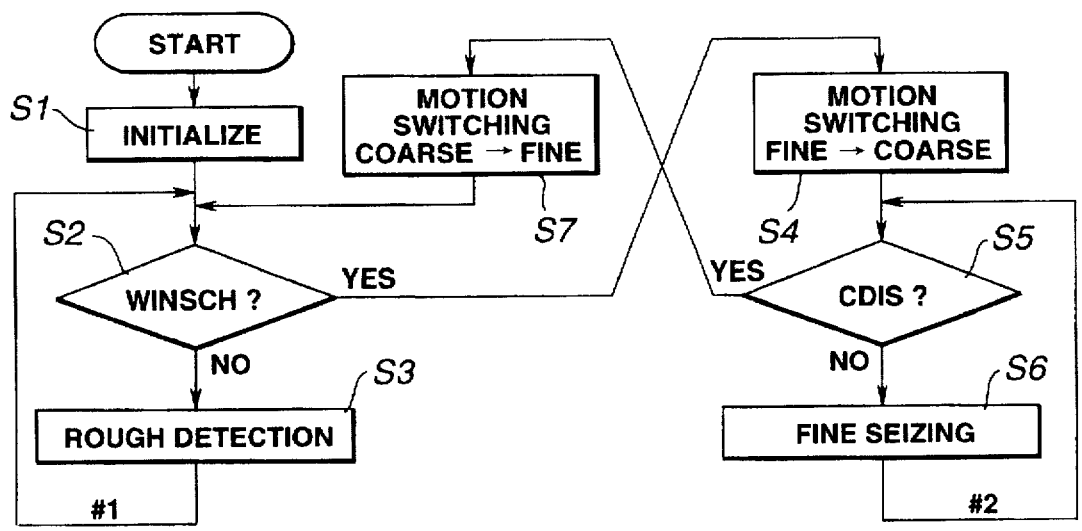
FIG. 6 is a flowchart for illustrating the phase seizure operation in the playback clock generating circuit according to the present invention.

Referring to the basic operating flow, shown in FIG. 6, the above-described playback clock generating circuit performs rough detection based on the playback signal of the reference pattern during reproduction of the reference area, while performing fine seizure on detection. The playback control generating circuit then finds the phase average during the seizing period in order to find an optimum phase. The playback clock generating circuit then corrects the clock using the optimum phase thus found for use as a data extraction clock.

That is, the controller 22 of the playback clock generating circuit sets SRES=H, that is the rough detection operation mode (#1) by initializing processing S1 on starting the operation and repeats the rough detection operation S3 as it performs the decision processing S2 for WINSCH. If, at the decision step S2 of WINSCH, the polarity inversion detection signal snch is detected within the A and C timing signal win of the 2T+2T pattern playback waveform (sine wave of a 4T period), the controller 22 performs the switching of the operating mode (S4) for transition from SRES=H, that is the rough detecting operation (#1) to SRES=L, that is the fine seizure operating mode (#2). Thus the controller 22 performs a fine seizure operation S6 as it performs decision processing S5 of CDIS. If, as a result of the decision processing S5 of CDIS, it has been detected that the setting limit of the detection range has been reached by the decision processing S5 of CDIS, the switching processing S7 of the operating mode is performed for reversion from SRES=L, that is the fine seizing operation mode (#2), to SRES=H, that is rough detection operating mode (#1), in order to repeat the rough detection processing S3 as the controller performs the decision processing S2 of WINSCH described above.

Figure 7:
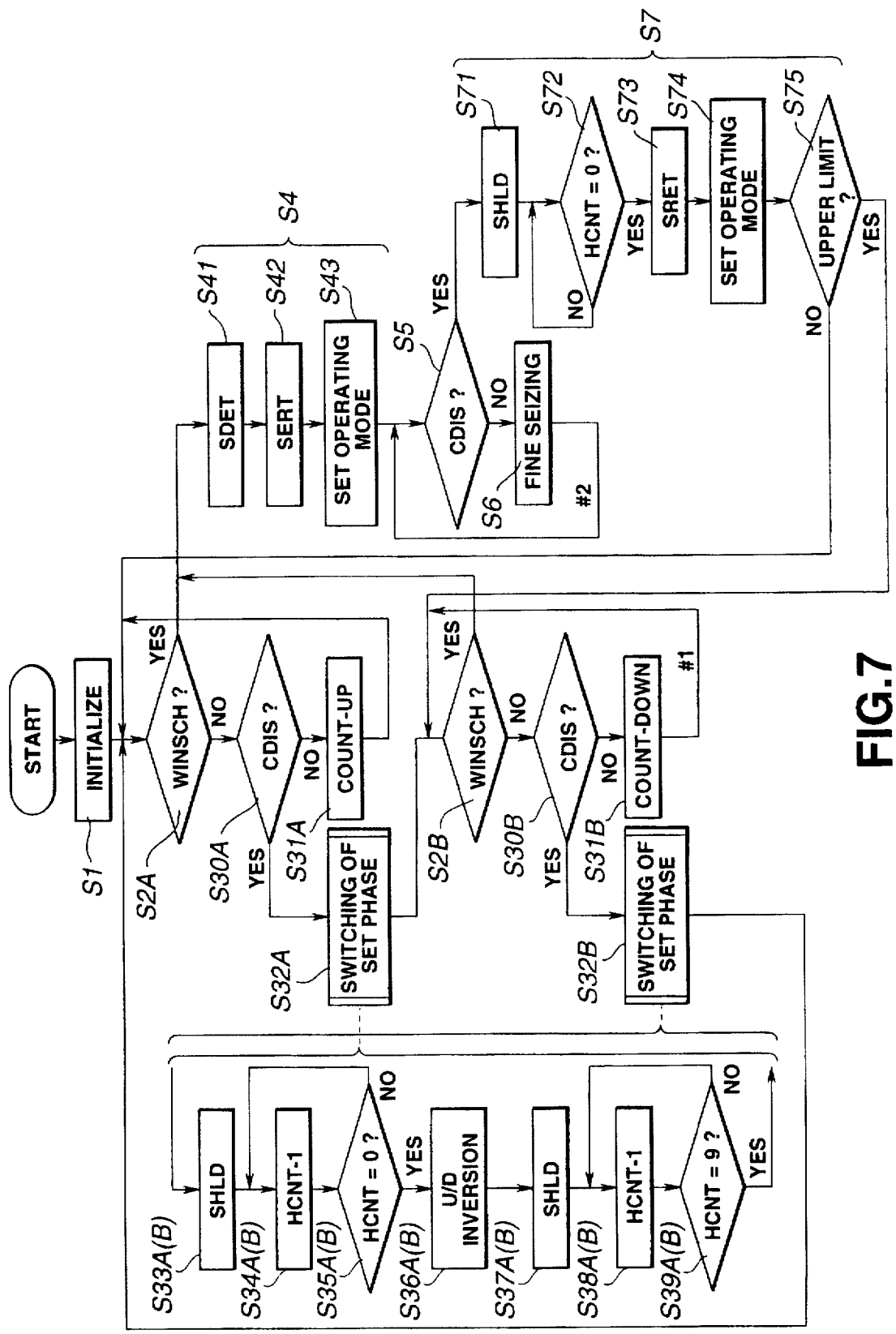
FIG. 7 is a flowchart showing the specified operation of the playback clock generating circuit according to the present invention.

Referring to the detailed operational flow of FIG. 7, the rough detection operation S3 is started in such a manner that, at the start of operation, SU__D=H is set, that is the phase setting is set to phase setting increasing, with the first and second counters (CNT1 and CNT2) 23, 24 being set to the count-up states.

During this rough detecting operation S3, if the CDIS decision processing S30A is carried out and the threshold setting of the detection range has not been reached, the first and second counters (CNT1 and CNT2) 23, 24 count up at S31A in order to perform the WINSCH decision processing repeatedly.

If it is detected by the decision processing S30A of CDIS that the threshold setting of the detection range has been reached, the phase setting switching operation S32A is performed.

During the phase setting switching operation S32A, the phase setting is terminated by the SHLD processing S33A. Under this condition, the decrementing operation S34A of FHC=HCNT−1 and the HCNT=0 decision processing S35A are performed repeatedly. If HCNT=0 is reached, SU D=L is set, that is the phase setting is set to decreasing phase setting. Under this condition, the FHC=HCNT+1 incrementing operation S38A and the HCNT=9 decision processing S39A are performed repeatedly. When HCNT=9 is reached, processing transfers to the WINSCH decision processing S2B.

If the CDIS decision processing S30B is carried out and the setting limit of the detection rage is not reached, the first and second counters (CNT1, CNT2) 23, 24 count down at S31B in order to repeat the WINSCH decision processing S2B.

If, as a result of the CDIS decision processing S30B, it is detected that the setting limit of the detection range has been reached, the phase setting switching operation S32B is performed.

If, in the phase setting switching operation S32B, the CDIS decision processing S30B detects that the setting limit of the detection range has been reached, SHLD is set at S33B in order to terminate the phase setting. Under this condition, the FHC=HCNT−1 decrementing operation S34B and the HCNT=0 decision processing S35A are performed repeatedly. If the detected phase has caught up with the phase setting such that HCNT=0, SHLD is reset, while SU__D=H is set, that is the phase setting is set to increasing phase setting. The first and second counters (CNT1, CNT2) 23, 24 are switched to the count-up state at S36B. Then, SRET is set at S37B to shift the phase setting. Under this condition, the FHC=HCNT+1 increment processing S38B and the HCNT=9 decision processing S39B are performed repeatedly. If HCNT=9 is reached, processing transfers to the above-described WINSCH decision processing S2A. The SRETD is reset at a time point the detected phase starts to be shifted.

If, in the WINSCH decision processing S2A, S2B, the polarity inversion detection signal snch is detected within the timing signal win of the 2T+2T pattern playback waveform (sine wave of a 4T period), processing transfers to the operating mode switching operation S4.

If, in the operating mode switching operation S4, polarity inversion is detected by the WINSCH decision processing operations S2A, S2B, SDET is first set, and the processing S41 is performed for reverting the phase setting to the phase corresponding to the detection of the polarity inversion. If reversion to the phase setting has come to a close, SDET is reset, while the phase setting is terminated and the processing of setting SRET until the detected phase has caught up with the phase setting is performed at S42. When the detected phase has caught up with the phase setting, SRET is reset, while SRES=L is set, that is the processing S43 for setting SRES=L, that is the processing for setting the fine seizure operating mode (#2) is performed.

The fine seizing operation S6 is performed while the CDIS decision processing S5 is performed. At this fine seizure operation S6, the first and second counters (CNT1, CNT2) 23, 24 are set to the count-down state for decreasing the phase setting for the detection phase is A>C. If A>C, the first and second counters (CNT1, CNT2) 23, 24 are set to the count-up state for increasing the phase setting.

If, in the course of the fine seizure operation S6, the setting limit of the detection range is reached by the CDIS decision processing S5, the operating mode switching processing S7 is performed.

During the operating mode switching processing S7, the flipflop SHLD is set at S71 to terminate the phase setting. Under this condition, the HCNT=0 decision processing S72 is performed repeatedly before proceeding to processing S74 of setting a rough detection operation mode (#1).

The decision processing on whether the setting limit as detected by the CDIS decision processing S5 is an upper limit or a lower limit of the detection range is carried out at S75. If the setting limit is the lower limit, processing reverts to the WINSCH decision processing S2A in order to perform the rough detection processing S3 again, whereas, if the setting limit is the upper limit, processing reverts to the WINSCH decision processing S2B in order to perform the rough detection processing S3 again.

Figure 8:
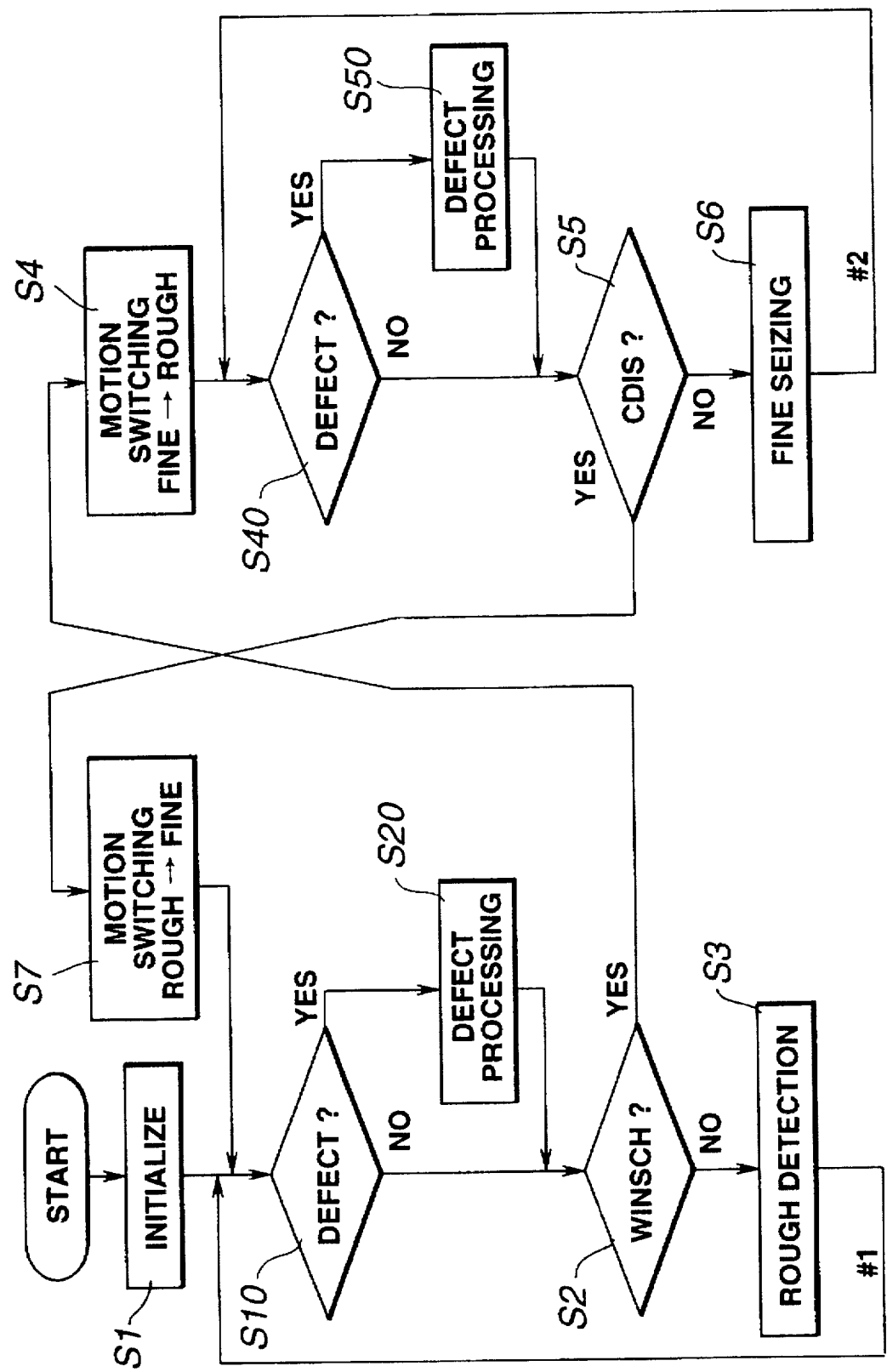
FIG. 8 is a flowchart for illustrating the schematic phase seizure operation including the defect processing of the playback clock generating circuit according to the present invention.

If, in the above-described playback clock generating circuit, processing on the defect of the recording medium is performed, a decision processing as to the possible presence of the defect S10 is performed before the WINSCH decision processing S2 for the rough detection mode (#1) and, in the presence of the defect, a defect processing S20 is carried out, whereas, for the fine seizure operating mode (#2), a decision processing as to the possible presence of the defect S40 is performed before the WINSCH decision processing S5 and, in the presence of the defect, a defect processing S50 is carried out, as shown in the basic operational flow of FIG. 8.

Figure 9:
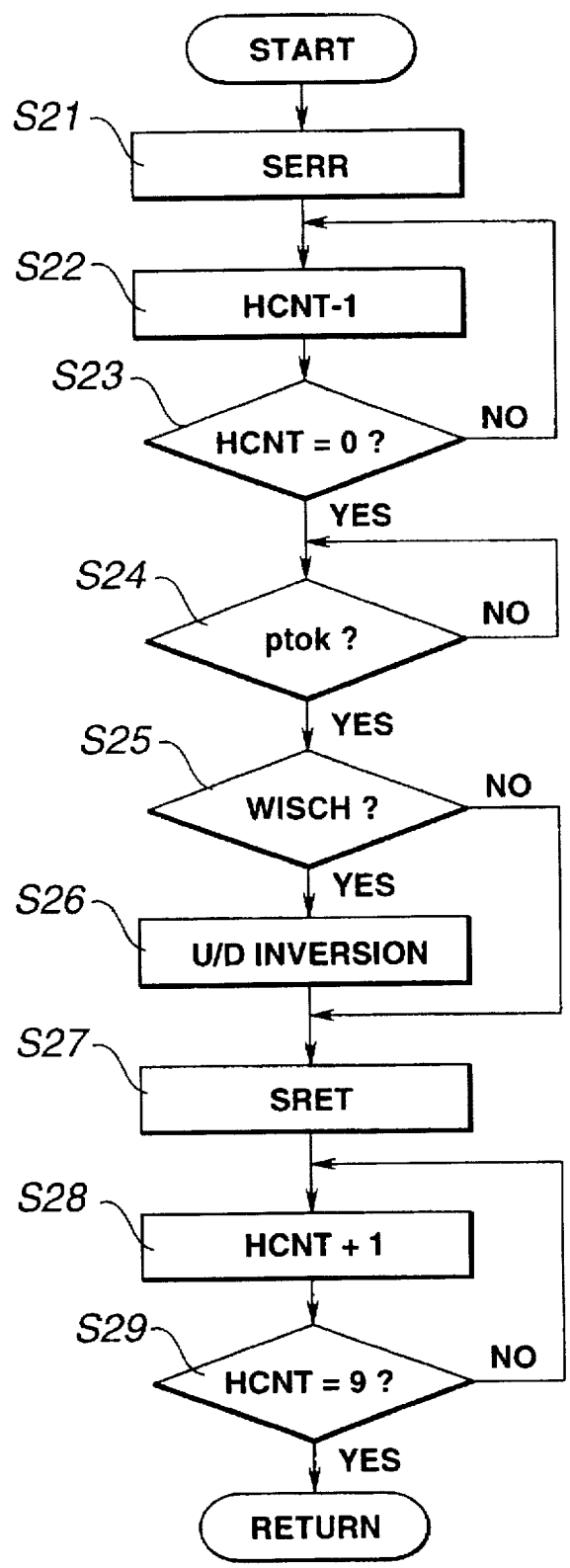
FIG. 9 is a flowchart for illustrating the defect processing during rough detection in the playback clock generating circuit according to the present invention.
Figure 10:
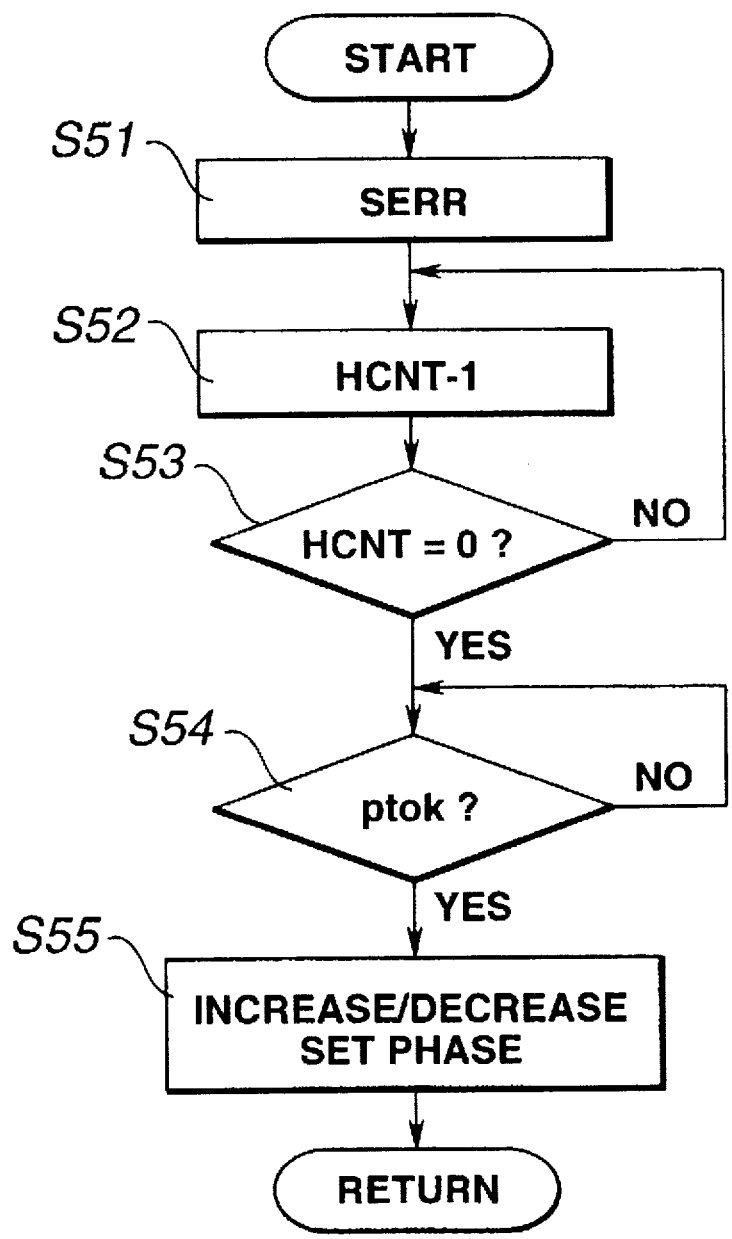
FIG. 10 is a flowchart for illustrating the specified operation including defect processing during the fine seizure operation in the playback clock generating circuit according to the present invention.

If, in the defect processing S20 in the above-described rough detection operation mode (#1), a defect is found, the processing S21 of setting the flipflop SERR for terminating the phase setting is carried out, as shown in the operational flow of FIG. 9. Under this condition, the FHC=HCNT−1 decrement processing S22 and a HCNT=0 decision processing S23 are repeatedly carried out. If the detected phase has caught up with the phase setting so that HCNT=0 and the result of the pattern decision processing S24 is OK, the flipflop SERR is reset, at the same time as the increasing/decreasing of the phase setting is re-started. The WINSCH decision processing S25 is then carried out. If, after reversion from this defect, polarity inversion has occurred, the processing S26 of inverting the direction of phase increase/decrease is carried out. The flipflop SRET is set until the detected phase starts to be moved at S27. Under this condition, the FHC=HCNT+1 increment processing S28 and the HCNT=9 decision processing S29 are repeatedly carried out. If the state of HCNT=9 is reached, processing transfers to the WINSCH decision processing S2.

If, in the defect processing S50 in the above-described fine seizing operating mode (#2), a defect is found, the processing S51 of setting the flipflop SERR for terminating the phase setting is carried out. Under this condition, the FHC=HCNT−1 decrement processing S52 and a HCNT=0 decision processing S53 are repeatedly carried out. If the detected phase has caught up with the phase setting such that HCNT=0, and the result of the pattern decision processing S54 is OK, the flipflop SERR is reset, at the same time as the increase/decrease of the phase setting is re-started at step S55 in order to move the phase setting. The processing then transfers to the above-mentioned CDIS decision processing S5.

In the defect processing S50 in the above-described fine seizure operational mode (#2), it is unnecessary to determine the phase setting increasing/decreasing direction on termination of the defect processing depending on whether or not polarity inversion has occurred during defect processing as in the case of the rough detection operating mode (#1). That is, the phase setting increasing/decreasing direction is spontaneously determined in the seizure operation under the normal state after the end of processing.

Figure 11:
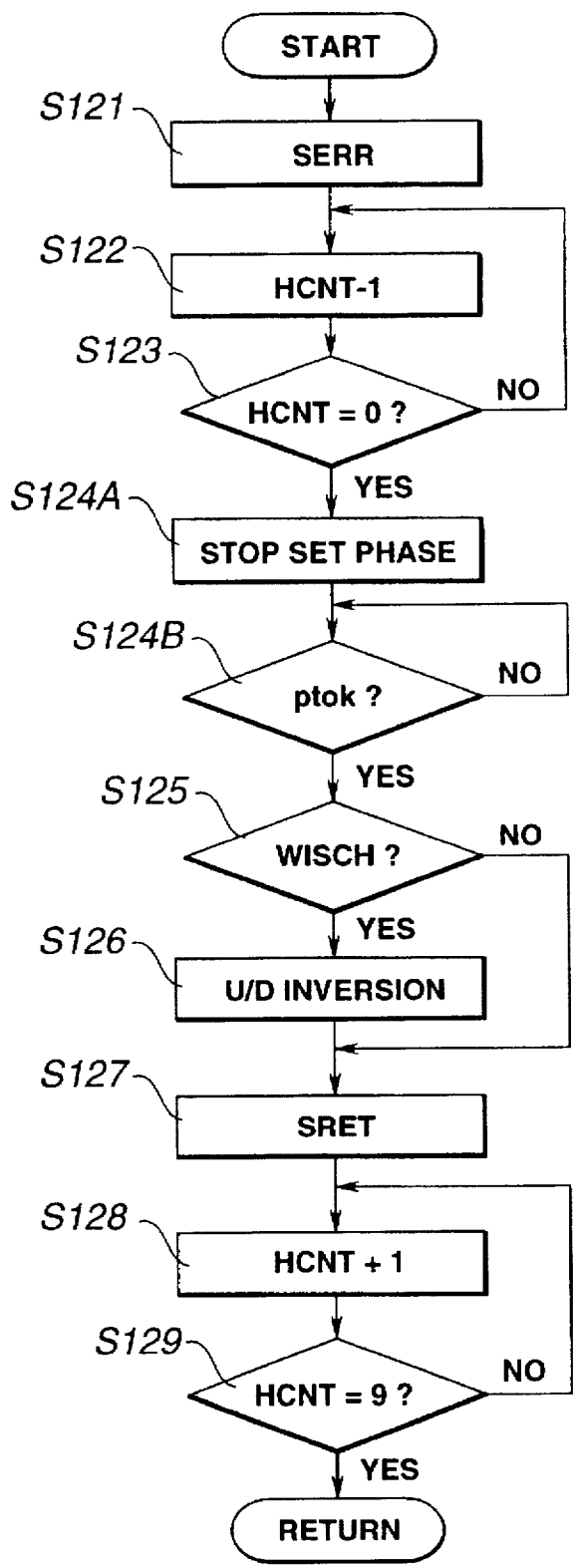
FIG. 11 is a flowchart for illustrating another example of defect processing during rough detection in the playback clock generating circuit according to the present invention.

The defect processing S20 for the above-described rough detection mode (#1) may be carried out in accordance with the operational flow shown in FIG. 11. That is, if a defect has been found, the processing S121 of setting the flipflop SERR for advancing the phase setting in the opposite direction is carried out. Under this condition, the FHC=HCNT−1 decrement processing S122 and a HCNT=0 decision processing S123 are repeatedly carried out for reverting the phase setting to the phase directly before the defect. The processing S124A of terminating the phase settling is then performed. When the detected phase has caught up with the phase setting, and the result of the pattern decision processing S124B is OK, the flipflop SERR is reset, at the same time as the increase/decrease of the phase setting is re-started. The WINSCH decision processing S25 is then carried out. If, after reversion from the defect, polarity inversion has occurred, the processing S126 of inverting the phase increase/decrease direction is performed. The flipflop SERR is set at S127 until the detected phase starts to be moved. Under this condition, the FHC=HCNT+1 increment processing S128 and a HCNT=9 decision processing S129 are repeatedly carried out. If the state of HCNT=9 is reached, processing transfers to the above-described WINSCH decision processing S2.

Figure 12:
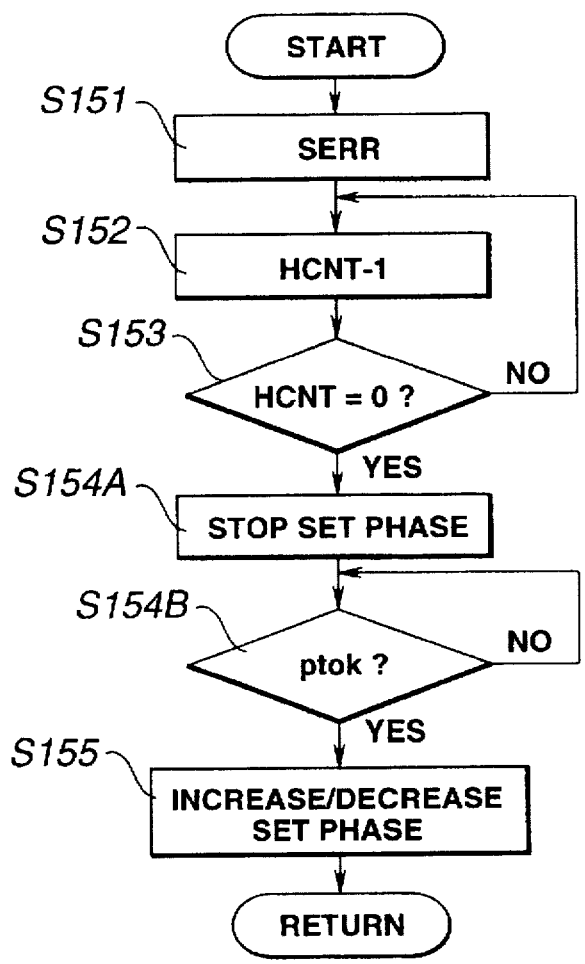
FIG. 12 is a flowchart for illustrating another example of defect processing during fine detection in the playback clock generating circuit according to the present invention.

The defect processing S50 in the above-described fine seizure operational mode (#2) may be carried out in accordance with the operational flow shown in FIG. 12. That is, if a defect is detected, the processing S151 of setting the flipflop SERR for advancing the phase setting in the opposite direction is carried out. Under this condition, the FHC=HCNT−1 decrement processing S122 and a HCNT=0 decision processing S153 are repeatedly carried out for reverting the phase setting to the phase directly before the defect. The processing S154A of terminating the phase setting is then carried out. If the detected phase has caught up with the phase setting, and the result of the pattern decision processing S154B is OK, the flipflop SERR is reset, at the same time as the increase/decrease of the phase setting is re-started at step S155 in order to move the phase setting. The processing then transfers to the above-mentioned CDIS decision processing S5.

The averaging circuit 25 averages the phase information $\Phi$ obtained with the seizure domain of the reference area in order to find a phase error $\Phi$.

Figure 13:
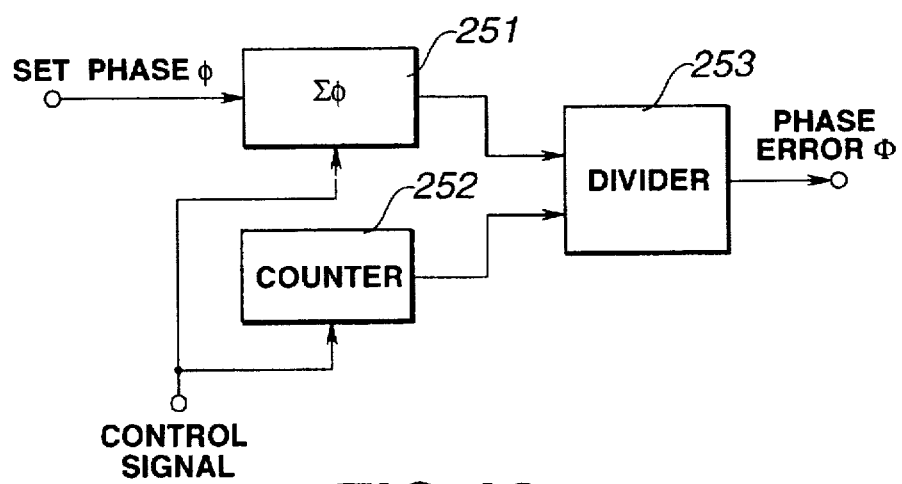
FIG. 13 is a block diagram showing the basic structure of an average value computing circuit in the playback clock generating circuit according to the present invention.

The averaging circuit 25 is made up of a cumulative adder 251 for cumulatively adding the phase information $\Phi$ obtained in the reference area seizure domain, a counter 252 for counting the playback clocks CK during the reference area seizure domain and a divider 253 for dividing an output $\Sigma\Phi$ of the cumulative adder 251 with an output X of the counter 252, as shown for example in FIG. 13.

In the averaging circuit 25, configured as shown in FIG. 13, the phase error $\Phi$ is computed by $$\Phi=(1/R)\Sigma\Phi=\Sigma\Phi/(\text{count number } X \text{ during the seizure domain}).$$

Figure 14:
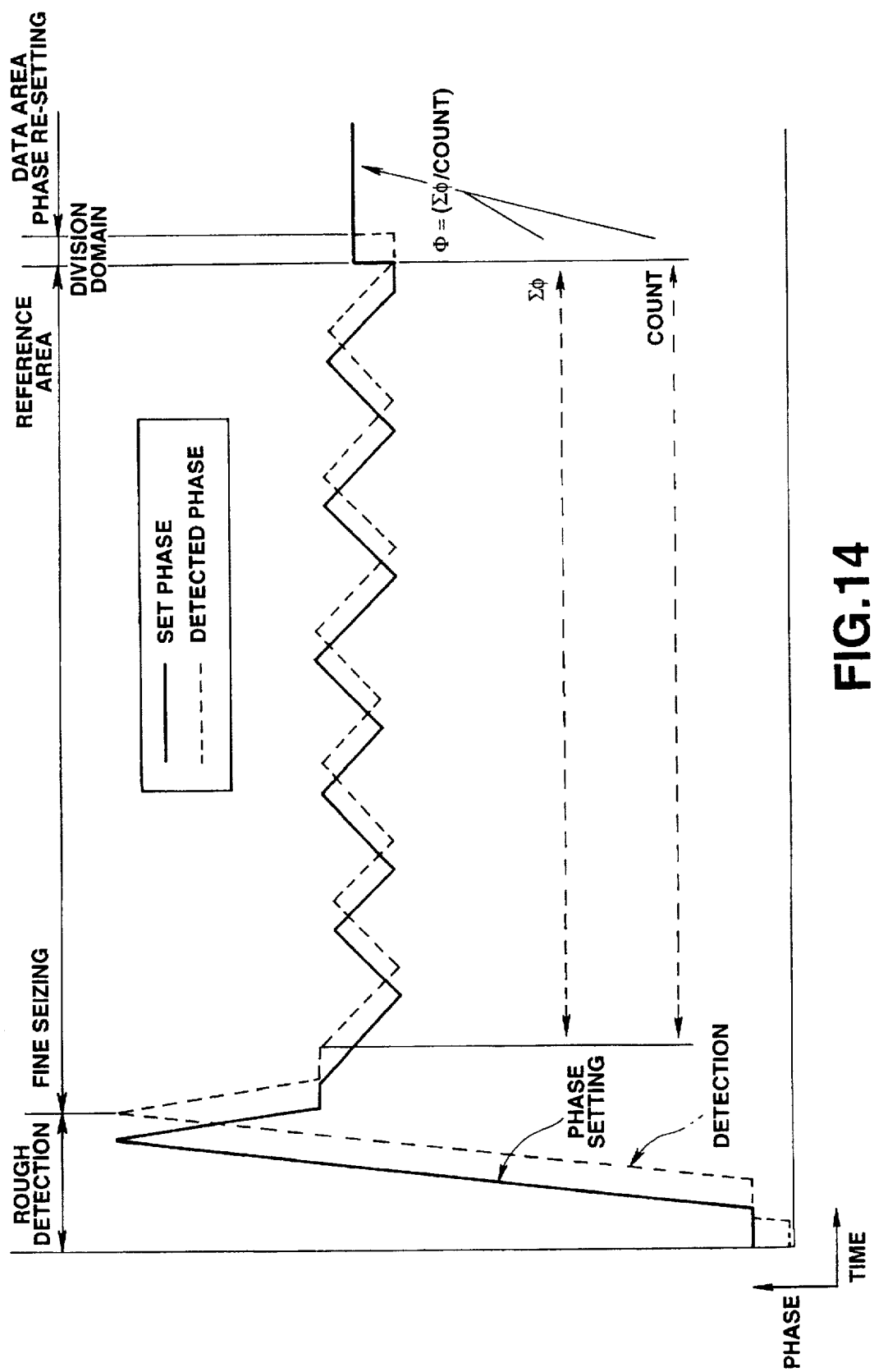
FIG. 14 is a timing chart showing the phase seizure operation in the playback clock generating circuit according to the present invention.

It is noted that the time lag of the order of 10 clocks is produced since the phase quantity is set by the clock generating processor 2A until the phase is given to the playback clocks CK by, for example, a delay element in the clock generator 3, the playback signal is sampled using the playback clocks CK and the result of processing derived from the sampled values (variation in the difference sign) is obtained. That is, if the direction of the phase setting increase/decrease is inverted directly after detection of the sign transition during the detecting operation, such direction inversion is not reflected instantly, but is converged in an oscillating mode, as shown in FIG. 14. If, in this figure, the phase setting is represented as cos p and the phase=detected phase corresponding to the result of processing of the reproduced waveform (A–C) is represented by sin p, with cos p and sin p being periodic functions, the above-mentioned time lag corresponds to the phase difference π/2. Since the detected result governs the phase setting increasing/decreasing direction, this phase difference π/2 is constant even on the real-time basis. However, since the spacing between A=C of the playback waveform and next A=C is not necessarily constant due to, for example, the effect of noise, the periods of cos p and sin p are not necessarily constant on the real time basis.

That is, in the playback signal of the reference pattern in the reference area seizure domain, the spacing between A=C of the playback waveform and next A=C is not necessarily constant due to, for example, the effect of noise. Moreover, the seizure phase is not inherently fixed. Thus the seizure start time point and the seizure end time point are not constant such that some offset is produced in the phase error Φ obtained as the processing result.

However, such offset may be canceled by averaging the phase error from a point A=C up to the next point of A=C in the playback waveform as from polarity inversion until the next polarity inversion.

This corresponds to 1/π of an integrated value of the detected phase Φd=g* sin pθ+Φe over a range of from θ equal to −π/2 to θ equal to +π/2 or over a range of from θ equal to +π/2 to θ equal to +3π/2, such that Φe is found.

If the set phase is used, the above corresponds to 1/π of an integrated value of the set phase Φs=g* cos pθ+Φe over a range of from θ equal to 0 to θ equal to π or over a range of from θ equal to π to θ equal to 2π, such that Φe is found.

Figure 15:
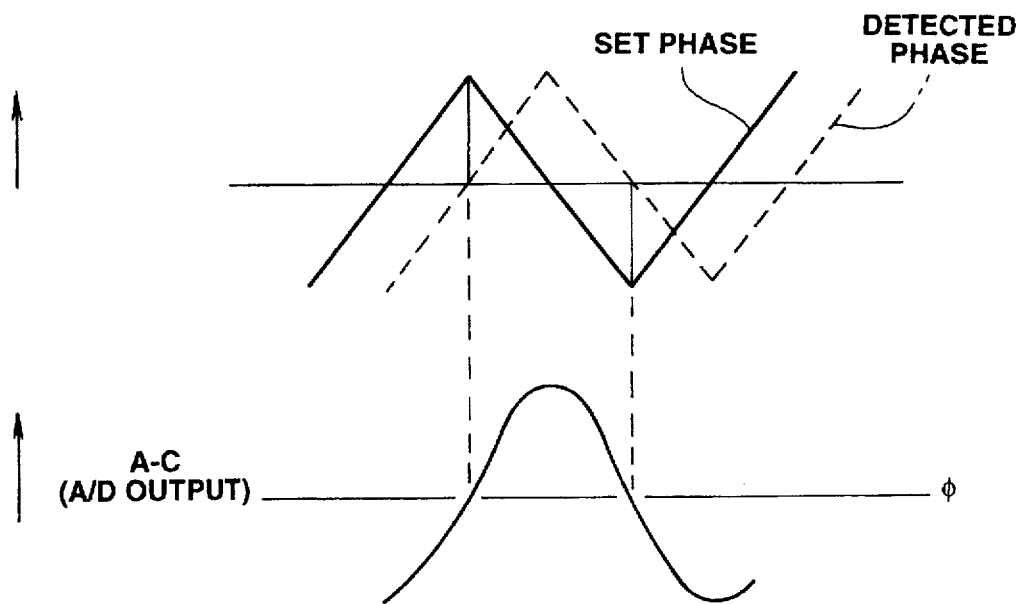
FIG. 15 is a timing chart for illustrating the phase seizure operation in case the phase error is computed by the average value computing circuit in the playback clock generating circuit according to the present invention shown in FIG. 13.

That is, in the averaging circuit 25, configured as shown in FIG. 13, by setting the seizure domain as designated by the control signal (enabling signal) inputted to the cumulative adder 251 and the counter 252 so as to be an enabling domain as from a polarity inversion up to the next polarity inversion, that is from a point of A=C to the next point A=C in the playback waveform, the phase error Φ such that $$\Phi = (1/\pi)\int \Phi$$
$$= \Sigma\Phi/(\text{count number for the domain of the range of } \theta \text{ equal to } \pi)$$

may be computed. The set phase is here used. FIG. 15 shows a timing chart.

Figure 16:
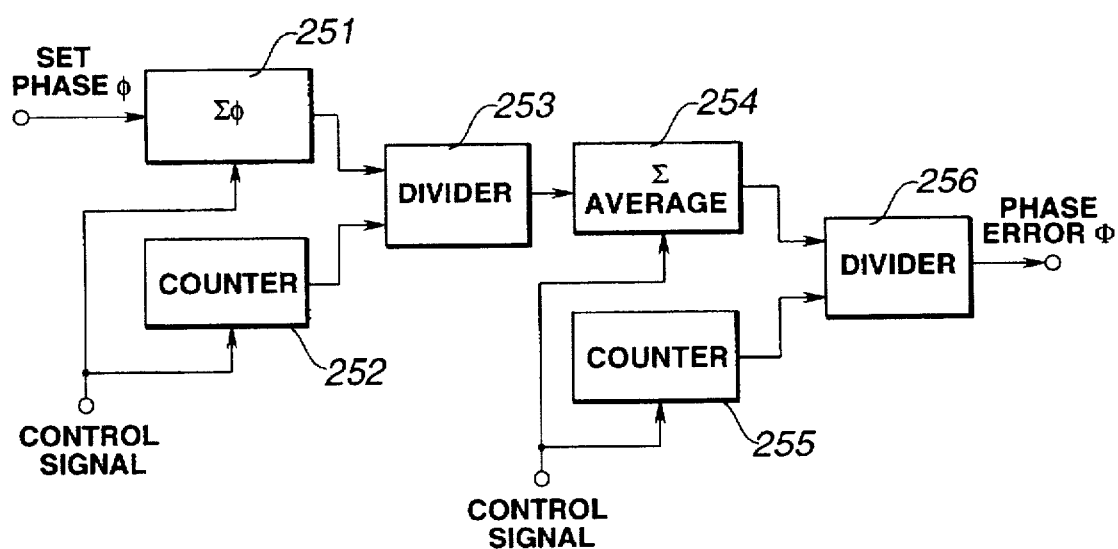
FIG. 16 is a block diagram showing a modified structure of the average value computing circuit in the playback clock generating circuit according to the present invention.
Figure 17:
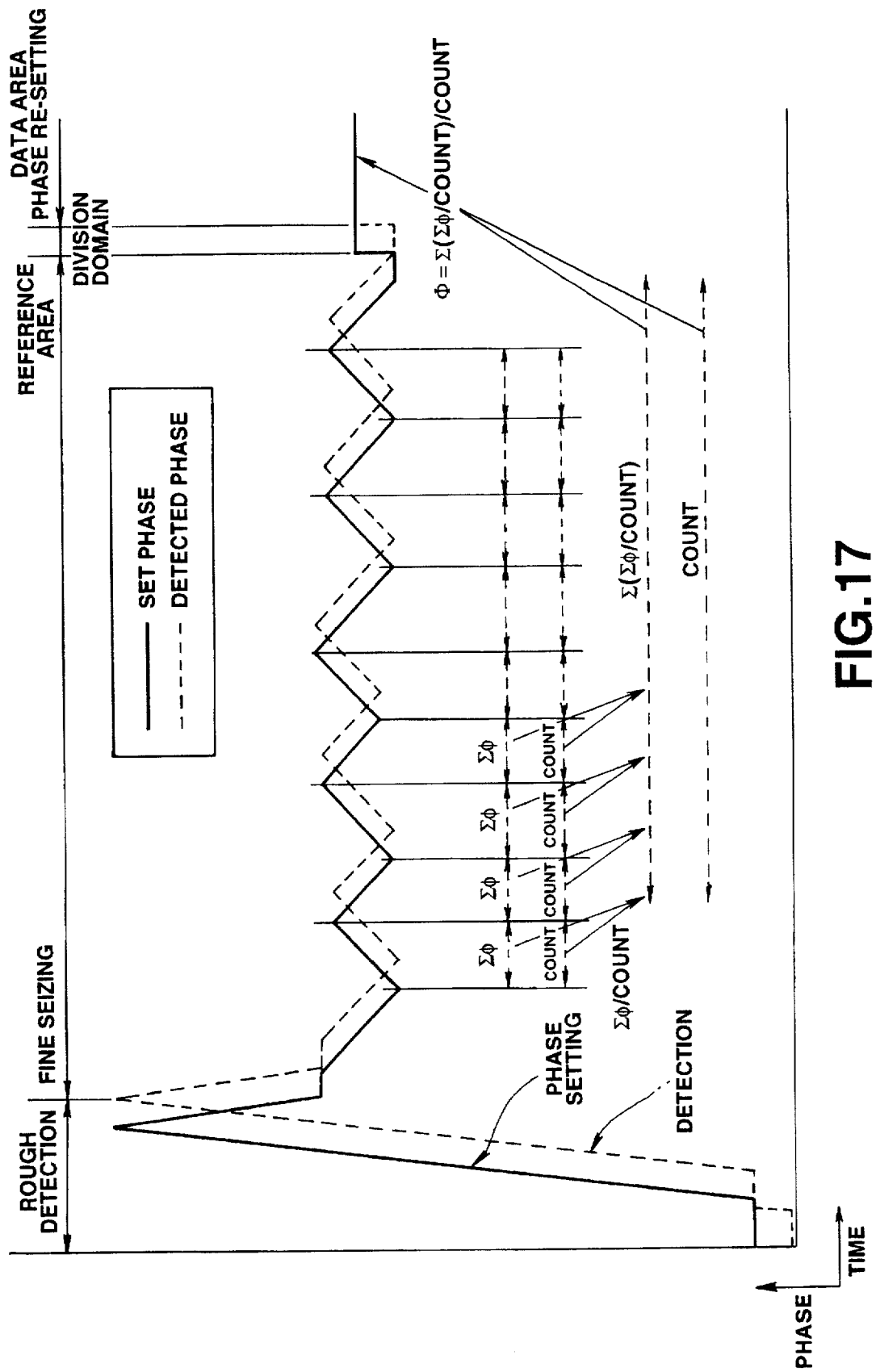
FIG. 17 is a timing chart for illustrating the phase seizure operation in case the phase error is computed by the average value computing circuit in the playback clock generating circuit shown in FIG. 16 according to the present invention.

The above-mentioned averaging circuit 25 may be configured as shown in FIG. 16. In the averaging circuit 25, shown in FIG. 16, a domain of Φs=g* cos pθ+Φe for which θ ranges from 0 to π or from π to 2π, that is from one polarity inversion to the next polarity inversion, that is from a point of A=C to the next point of A=C in the playback waveform, is taken as a unit, and the average phase obtained from one unit to another as an output of the divider 253 in FIG. 13 is cumulatively summed by the cumulative adder 254, while the number of unit counts is obtained by a counter 255. An average value is then found by a divider 256 over the entire reference area to compute the phase error Φ such that $$\Phi = \Sigma \text{ (unit-based average value } \Phi)/(\text{number of unit counts})$$
$$= \Sigma(\Sigma\Phi/(\text{number of counts for the domain of } \theta \text{ with a range of } \pi)/(\text{number of unit counts})$$

is computed. FIG. 17 shows a corresponding timing chart.

Figure 18:
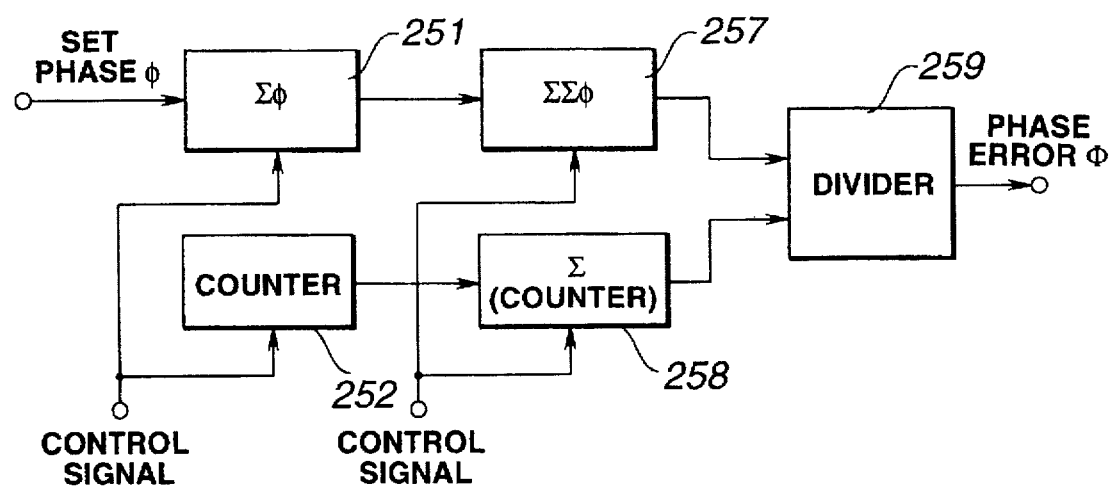
FIG. 18 is a block diagram showing another modified structure of the average value computing circuit in the playback clock generating circuit according to the present invention.
Figure 19:
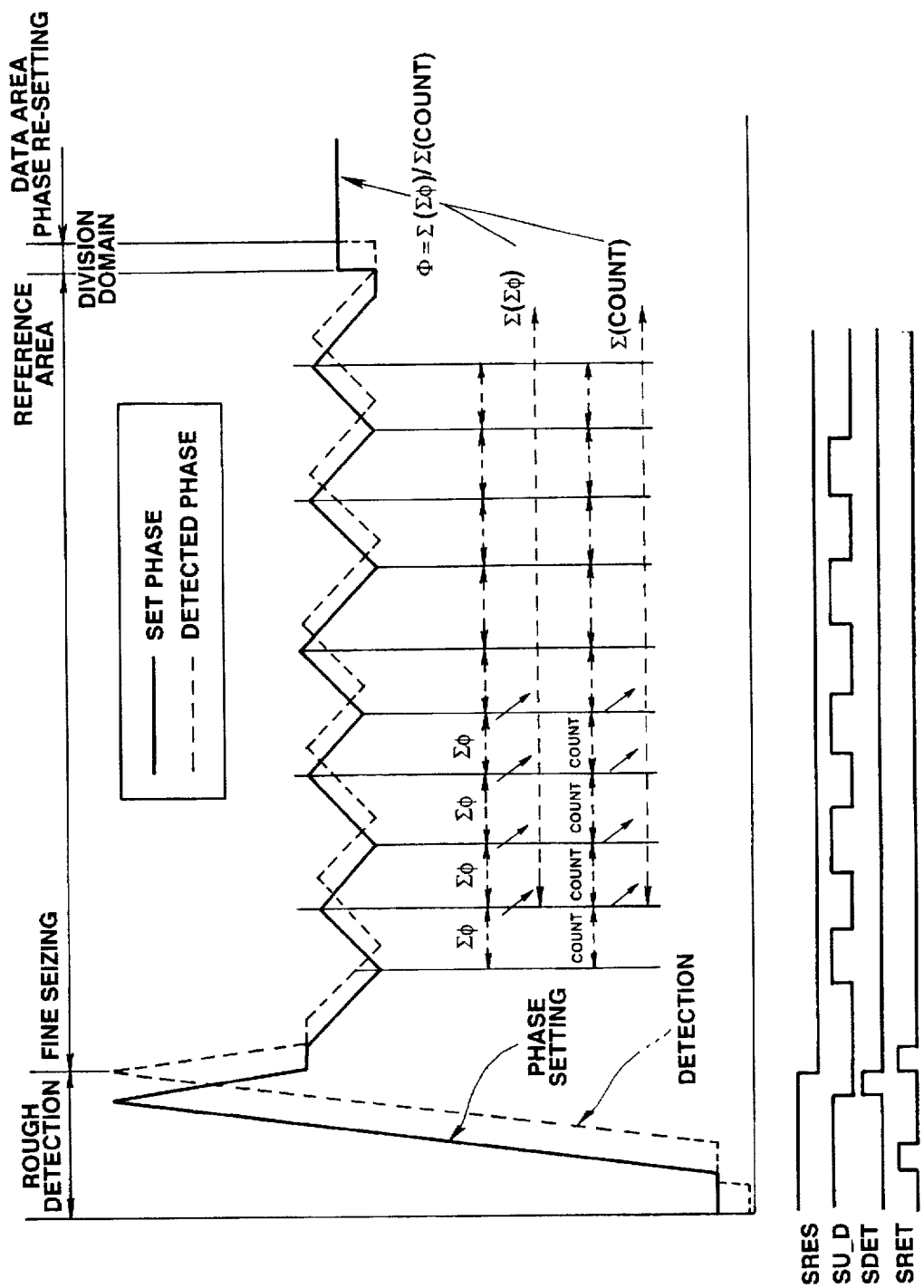
FIG. 19 is a timing chart for illustrating the phase seizure operation in case the phase error is computed by the average value computing circuit in the playback clock generating circuit shown in FIG. 18 according to the present invention.

The above-mentioned averaging circuit 25 may be configured as shown in FIG. 18. In the averaging circuit 25, shown in FIG. 18, the unit-based phase sum output obtained by the cumulative adder 251 of FIG. 13 is cumulatively summed over the entire reference area by a cumulative adder 251, the unit-based number of counts obtained by the counter 252 is cumulatively summed over the entire reference area by a cumulative adder 258 and an average over the entire reference area is taken by a divider 259 in order to compute the phase error Φ such that Φ=Σ (ΣΦ/Σ (count). The corresponding timing chart is shown in FIG. 19. In this case, only a sole divider suffices. It is unnecessary for the divider to perform the division by one step, but it is only necessary for the divider to perform the division by a number of steps as determined by the number of digits of Σ (counts). The upper limit is set by the length of the reference area. The register in the Σ(ΣΦ) may be used simultaneously for the division.

When the average phase is computed as the phase error Φ by the averaging circuit 25, the seizure operation is not affected if there is no abnormality before and after detection of polarity inversion. However, the seizure operation is affected by the protracted abnormality such as the defect in the recording medium. Therefore, defect detection is carried out in order to eliminate the information on the defect domain from the operation of computing the average phase. In the averaging circuit 25, configured as shown in FIG. 18, a disabling signal of terminating the operation for the defect domain is inserted in the defect domain as a control signal inputted to the cumulative adder 251 and to the counter 252 for excluding the unreliable phase information from the calculation for finding the highly reliable average phase as the phase error Φ.

Since an offset is superimposed in this case on the average phase depending on the defect position, the defect domain is excluded in terms of a length extending from a polarity inversion to the next polarity inversion, that is from a point corresponding to A=C to the next point A=c in the playback waveform. For example, a flag is set for indicating the defect detection and kept to be set until the beginning of the next unit, that is until A−C polarity inversion, as a unit. If there is no defect at the time point of beginning of the next unit, the flag is reset. The information of the unit where the flag has been set is not used for addition of Σ (ΣΦ) and Σ (count). The operation of the cumulative adders 257, 258 for computing Σ (ΣΦ) and Σ (count) is disabled based on the flag information. By so doing, the unreliable phase information can be eliminated from the computation, while the offset is also eliminated, for computing the highly reliable average phase as the phase error Φ.

In the above-described averaging circuit 25, configured as shown in FIG. 16, the phase information for the defect domain can be directly eliminated by creating the disable signal from the defect detection information and routing the disable signal to the cumulative adder 251 and to the counter 252. It is also possible to set a flag on defect detection and to disable the cumulative adder 254 and the counter 255 based on this flag for eliminating the defect domain from unit to unit.

An up/down counter is used as a phase-representing circuit, an output of which is used as a set phase for a delay element, for example, in the playback clock generator 3 and also as the phase information for the average value computing circuit 25.

In general, phase error detection is not necessarily performed within one clock. If the reference pattern of 2T+2T as in the present embodiment is used, detection can ideally be achieved within the range of 4 clocks. On the other hand, phase resolution is not necessarily represented by simple binary number in the case of a delay element in the playback clock generator 3. Conversely, in the averaging circuit 25, where division is involved, simple binary number is optimum.

Thus the present playback clock generating circuit uses a base-n up/down counter with variable resolution as a first counter 23 for directly supplying the phase-setting data directly to the clock generator 3, while using a simple binary counter as a second counter 24 for phase averaging for supplying the phase information to the averaging circuit 25.

Figure 20:
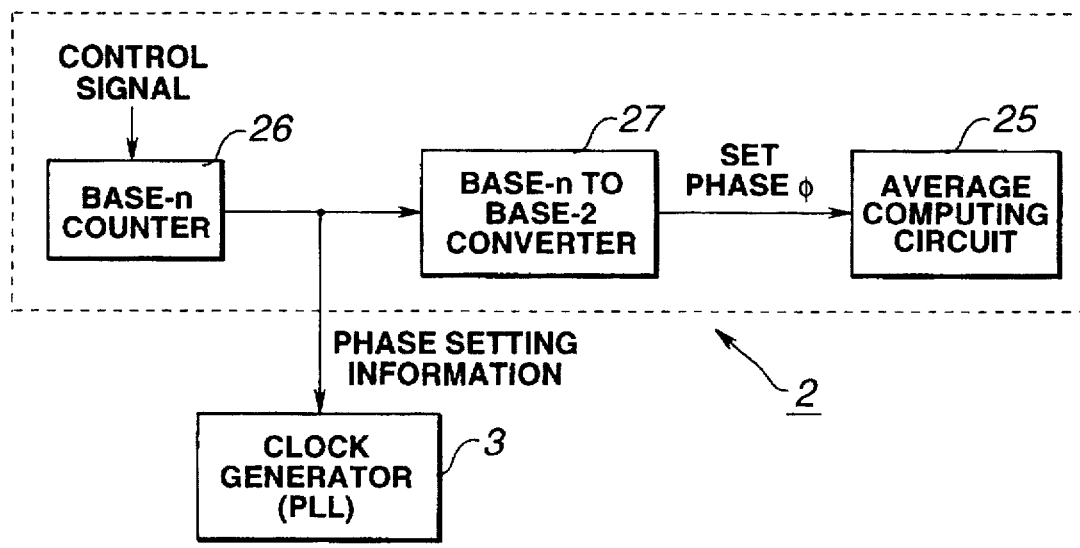
FIG. 20 is a block diagram showing essential portions of a modified embodiment of a clock generating processor in the playback clock generating circuit according to the present invention.

A sole base-n counter 26 may be used as each of the first and second counters 23, 24, and the phase information may be supplied to the averaging circuit 25 via a base n to binary converting circuit 27, as shown in FIG. 20.

In detecting the abnormality of the playback signal for the reference pattern, a defect is assumed to have occurred in a recording medium if pattern abnormality persists. The recording medium is deemed to be unobjectionable if the playback waveform is as expected, and only the reference pattern suited to extraction of the phase information is used.

If the playback waveform is not as expected, the recording medium is deemed to be defective. However, since it is probable that the playback waveform is not as expected due to noise or the like other factors, the fact that the recording medium is deemed to be defective does not directly lead to judgment that the recording medium is defective. The information for the case in which the playback waveform is not as expected due to noise or the like is not desirable as such. However, the effect of the local abnormality is only small. The reference area is limited and the information cannot be wasted, such that the processing loss for the assumed defect is considerable. Therefore, it is checked whether or not the abnormal state persists, and a defect is assumed to be present if the abnormal state persists for a length longer than a pres-set length.

Specifically, the decision on abnormality of the playback signal of the reference pattern is given by the following method.

Figure 21:
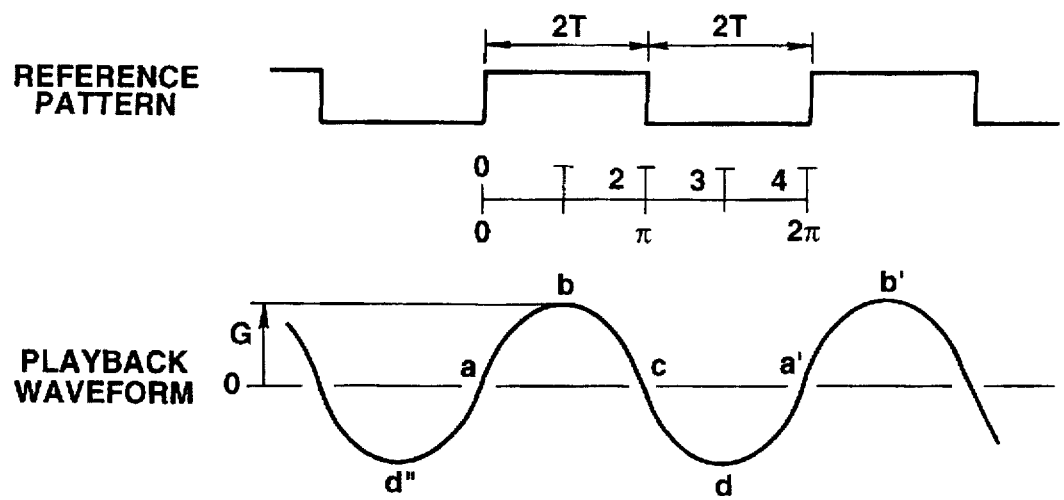
FIG. 21 is a waveform diagram for illustrating the method for judging abnormality in the reference pattern reproducing signal in the playback clock generating circuit according to the present invention.

It is assumed that the reference pattern is a repetitive pattern of 2T+2T=4T period and, on reproduction, gives a sine waveform with a 4T period of the form of $$RF = G^* \sin(2\pi/4T^*x) + 0$$

to give the playback waveform RF, as shown in FIG. 21.

From the playback signal RF, the playback amplitude on the one-clock basis, that is every 1T period, is obtained as the information.

If, in FIG. 21, the playback amplitude at a certain time point is a0, then b0, c0, d0 and A1 denote the playback amplitudes occurring after approximately 1T ($\pi/2$), 2T, 3T and 4T ($2\pi=0$), respectively.

The present playback clock generating circuit performs phase matching so that a=c, using a and c spaced apart by a one-half period (2T), in order to find the phase quantity, as described above. The pattern detection information is found from the neighboring sampling amplitude (1T).

In the waveform shown in FIG. 21, it suffices to perform pattern decision with d<a<b and b>c>d or with b>c>d and d<a<b for obtaining the phase information with a and c or with c and a, respectively.

Figure 22:
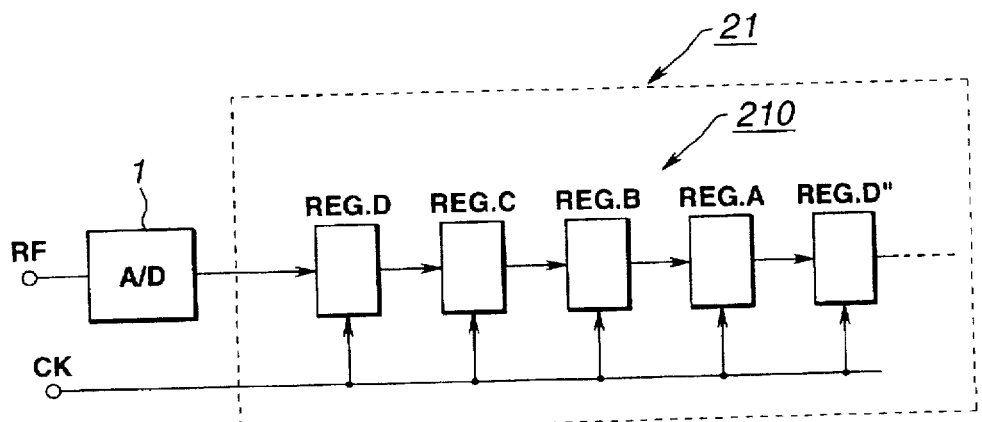
FIG. 22 is a block diagram showing essential portions of a detector in the playback clock generating circuit according to the present invention.
Figure 23:
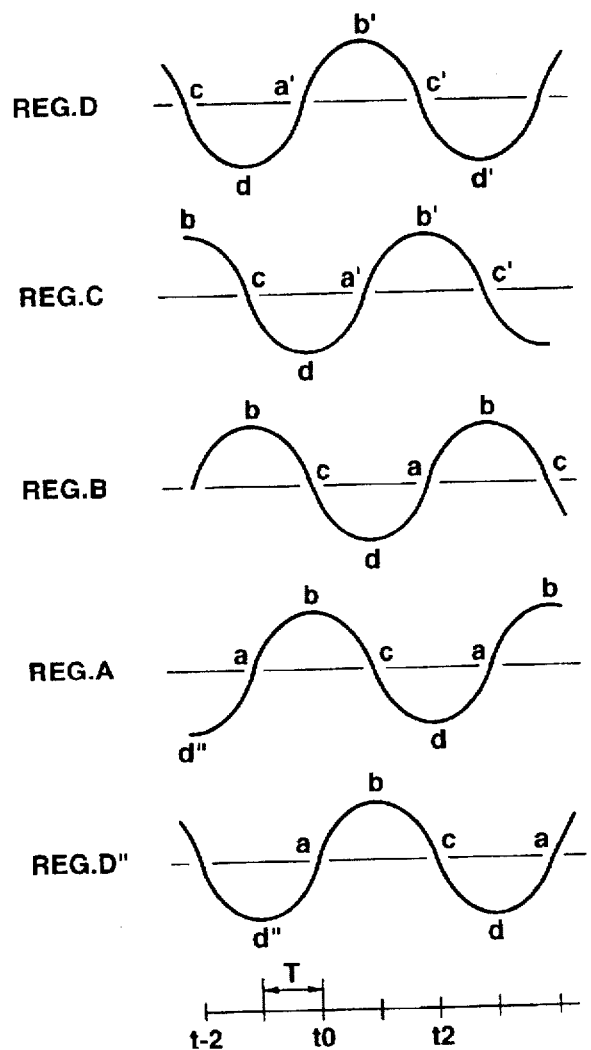
FIG. 23 illustrates playback signals of the reference pattern in the detector as waveform data.

In the detector 21, sampled values obtained on sampling the playback waveform with the A/D converter 1 are sequentially inputted to an imaginary shift register 210 configured as shown in FIG. 22. FIG. 23 shows, as waveform data, data D, C . . . of registers of respective stages REG D, REG C, . . . . These data, which in fact are discrete data, are shown by waveform data in FIG. 23 for ease in understanding.

At time t0, B>C>D, so that b>c>d.

At time t2, B<C<D, so that d>aÆ>bÆ. Since time t2 is delayed by 2T from t0, the waveform data in each register is the waveform that occurred 2T afterwards.

At time t2, since B<C<D, d"<a<bÆ. Since the time t2 is ahead of time t0 by 2T, the waveform data in each register is the waveform that occurred 2T ahead.

As may be seen from above, pattern decision is given from d"<a<b and b>c>d with the use of the phase information a and c, while pattern decision is given from b>c>d and d <aÆ<bÆ with the use of the phase information c and a.

Figure 24:
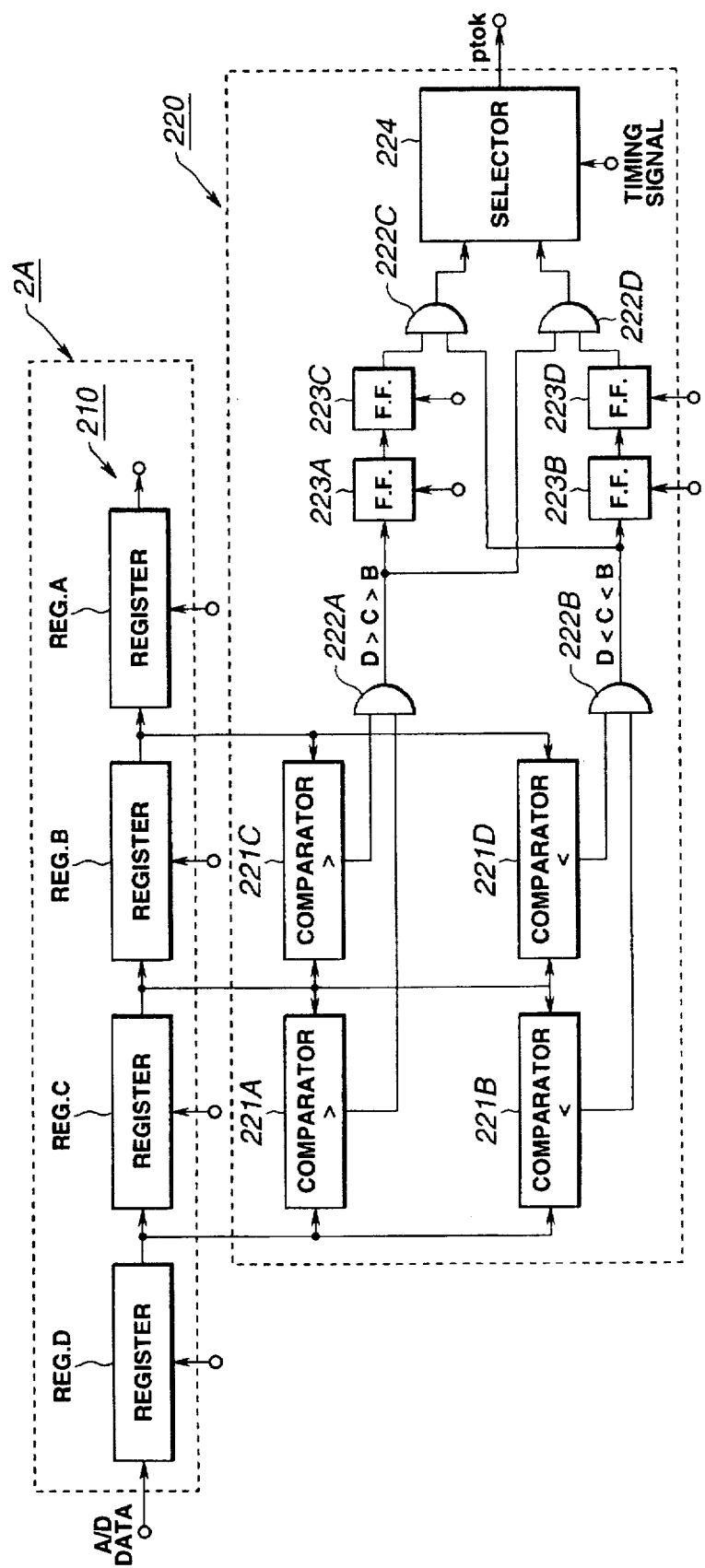
FIG. 24 is a block diagram showing the structure of pattern decision means provided in a controller of the clock generating processor.

In the controller 22 of the clock generating processor 2A, pattern decision means 220 performing such pattern decision is made up of four magnitude comparators 221A, 221B, 221C and 221D, AND gates 222A, 222B, 222C and 222D, flipflops 223A, 223B, 223C and 223D, and a sole data selector 224, as shown in FIG. 24.

In the pattern decision means 220, shown in FIG. 24, the first magnitude comparator 221A compares the magnitudes of the registers REG D and REG C of the detector 21 and, on detection of D>C, outputs a comparison output of the logical æHÆ to the first AND gate 222A. The second magnitude comparator 221B compares the magnitudes of the registers REG D and REG C of the detector 21 and, on detection of D<C, outputs a comparison output of the logical æHÆ to the second AND gate 222B. The third magnitude comparator 221C compares the magnitudes of the registers REG C and REG B of the detector 21 and, on detection of C>B, outputs a comparison output of the logical æHÆ to the first AND gate 222A. The fourth magnitude comparator 221D compares the magnitudes of the registers REG C and REG B of the detector 21 and, on detection of C<B, outputs a comparison output of the logical æHÆ to the second AND gate 222B.

The first AND gate 221A takes a logical product of the comparison outputs of the first and third magnitude comparators 221A, 221C to produce a logical product output specifying D>C>B by logical æHÆ. The second AND gate 222B takes a logical product of the comparison outputs of the second and fourth magnitude comparators 221B, 221D to produce a logical product output specifying D<C<B by logical æHÆ.

The logical product output by the first AND gate 222A is supplied to the fourth AND gate 222D, while being also supplied via two-stage flipflops 223A, 223C to the third AND gate 222C after delay of two clocks. The logical product output by the second AND gate 222B is supplied to the third AND gate 222C, while being also supplied via two-stage flipflops 223B, 223D to the fourth AND gate 222D after delay of two clocks.

Thus the third AND gate 222C acquires the logical output specifying D>C>B, that is d"<a<b and b>c>d, two clocks ahead with D<C<B, by logical æHÆ. On the other hand, the fourth AND gate 222D acquires the logical output specifying D<C<B, that is b>c>d and d<aÆ<bÆ, two clocks ahead with D>C>B, by logical æHÆ.

The data selector 224 selects the logical product output by the third AND gate 222C with the use of the phase information a and c, while selecting the logical product output by the fourth AND gate 222D with the use of the phase information c and a. The data selector 224 then outputs the selected outputs as a pattern decision signal ptok.

Figure 25:
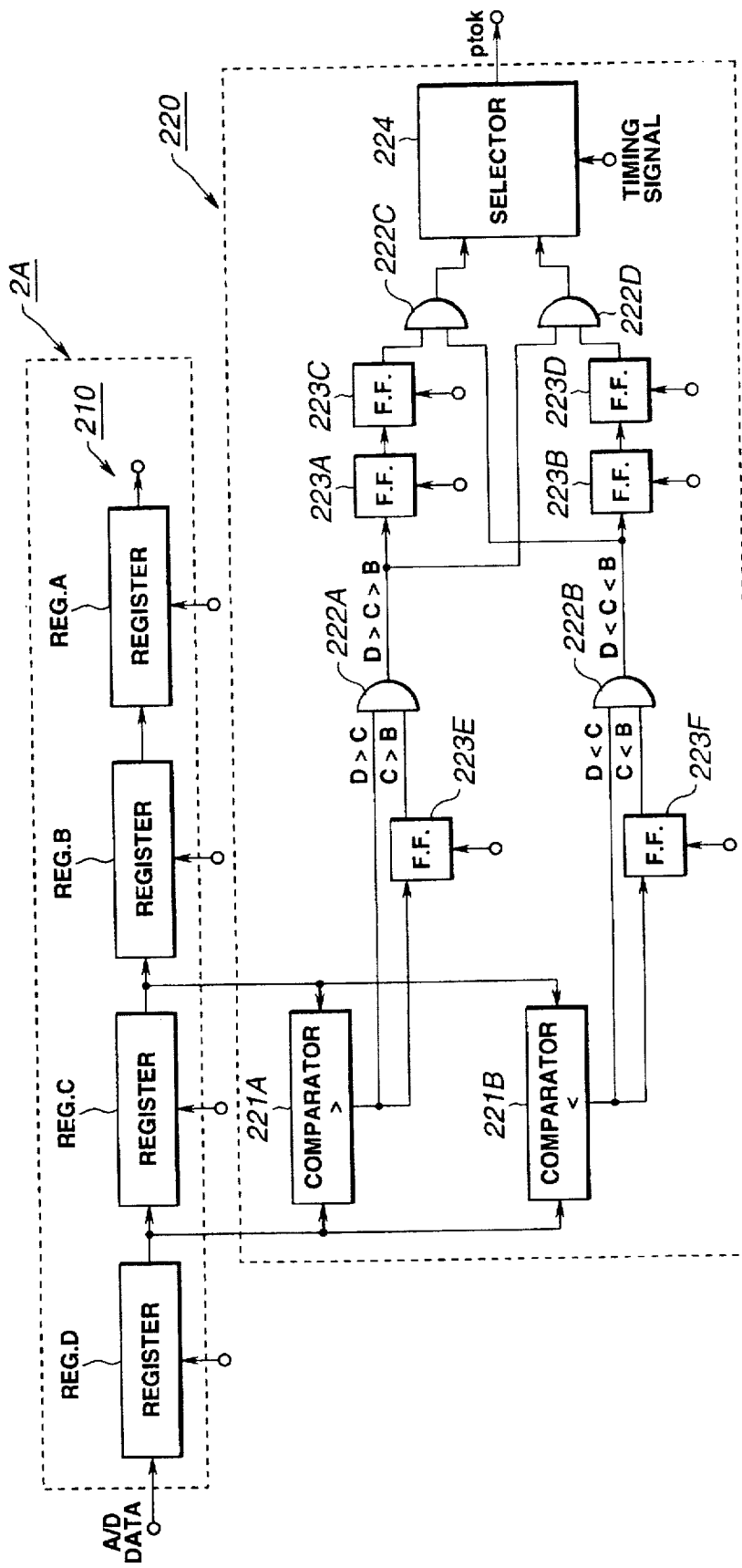
FIG. 25 is a block diagram showing another structure of the pattern decision means.

If the pattern decision means 220, shown in FIG. 24, the comparison output obtained by the third magnitude comparator 221C is the same as the comparison output obtained by the first magnitude comparator 221A one clock before, while the comparison output obtained by the fourth magnitude comparator 221D is the same as the comparison output obtained by the second magnitude comparator 221B one clock before. Thus, as shown in FIG. 25, it is possible to omit the third and fourth magnitude comparators 221C, 221D and to transmit the comparison outputs of the first and second magnitude comparators 221A, 221B via the flipflops 223E, 223F to the first and second AND gates 222A, 222B, respectively. With this configuration, both the circuit size and the processing time may be improved in efficiency.

With the waveform shown in FIG. 21, it is possible for the playback clock generating circuit to make pattern decision with d<a and b>c or with a<b and c>d for acquiring the phase information with a and c, while it is possible for the playback clock generating circuit to make pattern decision with b>c and d<a or with c>d and a<b for acquiring the phase information with c and a.

That is, during rough detection, it may occur that the sampling phase be deviated by $\pi/2=T/4$ such that a=b, c=d or d"=a and b=c. With the sine wave, there is no possibility of d"=a=b or b=c=d.

If sampling is deviated from the waveform of d"<a<b and b>c>d such that a=b and c=d or d"<a and b>c, or if sampling is deviated from the waveform d"<a<b or b>c>d such that d"=a and b=c, then a<b and c>d.

If the phase information of a and c is used, (1) D"<a and B>C
(2) A>B and C>D at a timing t0 of FIG. 23.

If the phase information of c and aÆ is used, (1) B>C and D<A
(2) C>D and A<B at a timing t2 of FIG. 23.

Pattern decision can be made using the inequalities (1) to (4) above.

During rough detection, it may occur that the sampling phase be deviated by not less than $\pi/2=T/4$, so that at timing t0 and at timing t2, the decision on using the phase information a and c and the decision on using the phase information c and aÆ occasionally become unknown. However, even in these cases, pattern decision can be made by checking which of the above inequalities holds.

The pattern decision means 220, making such pattern decision, may be made up of two magnitude comparators 221A, 221B, six flipflops 225A, 225B, 225C, 226A, 226B and 226C, four AND gates 227A, 227B, 227C and 227D and a sole OR gate 228.

Figure 26:
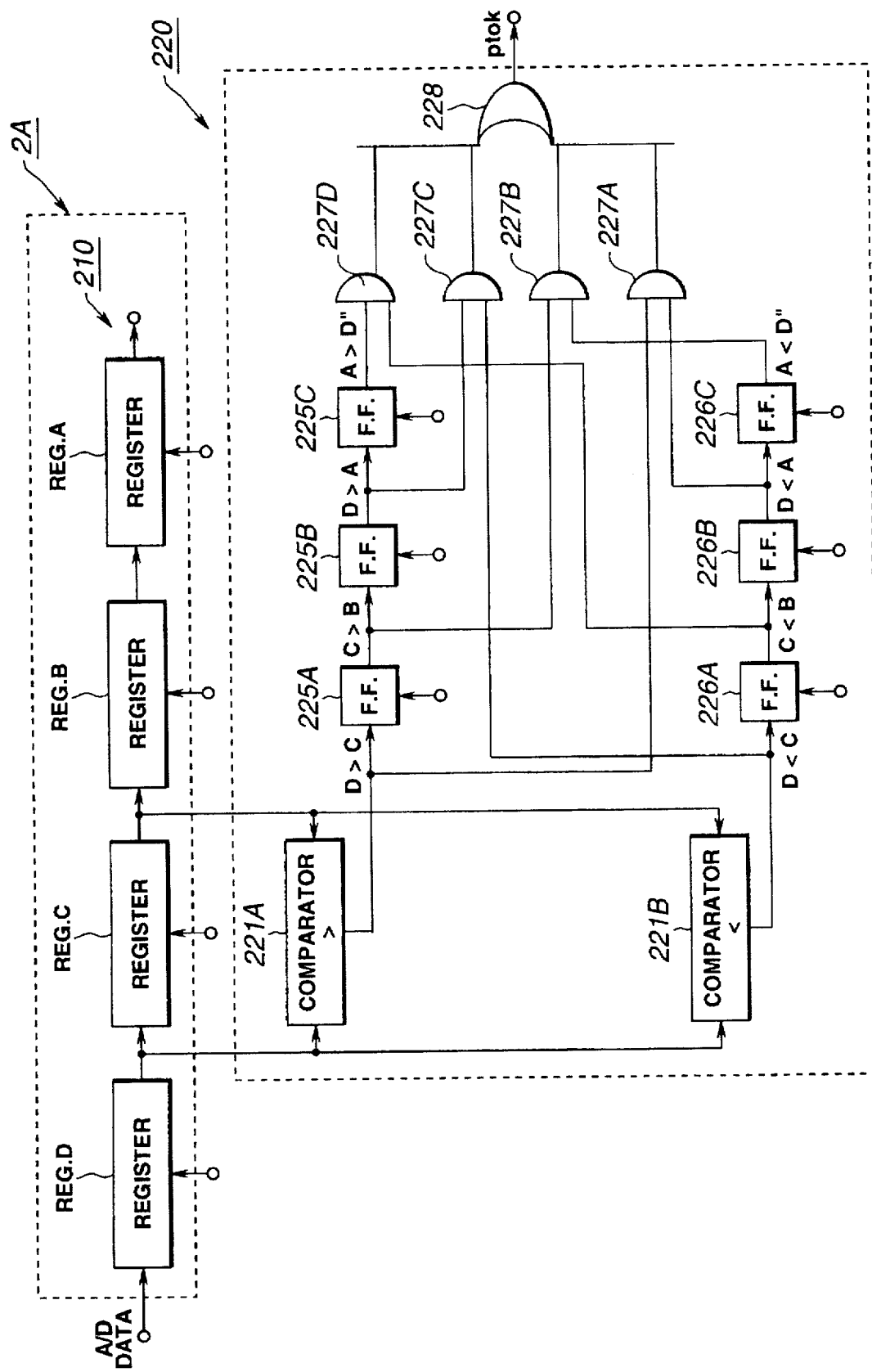
FIG. 26 is a block diagram showing another structure of the pattern decision means.

In the pattern decision means, shown in FIG. 26, the first magnitude comparator 221A outputs, on detection of D>C, a comparison output of a logical æHÆ to the first to fourth AND gates 227A, 227B, 227C and 227D directly and via first to third flipflops 225A, 225B, 225C. On the other hand, the second magnitude comparator 221B outputs, on detection of C>B, a comparison output of a logical æHÆ to the first to fourth AND gates 227A, 227B, 227C and 227D directly and via fourth to sixth flipflops 226A, 226B, 226C.

Figure 27:
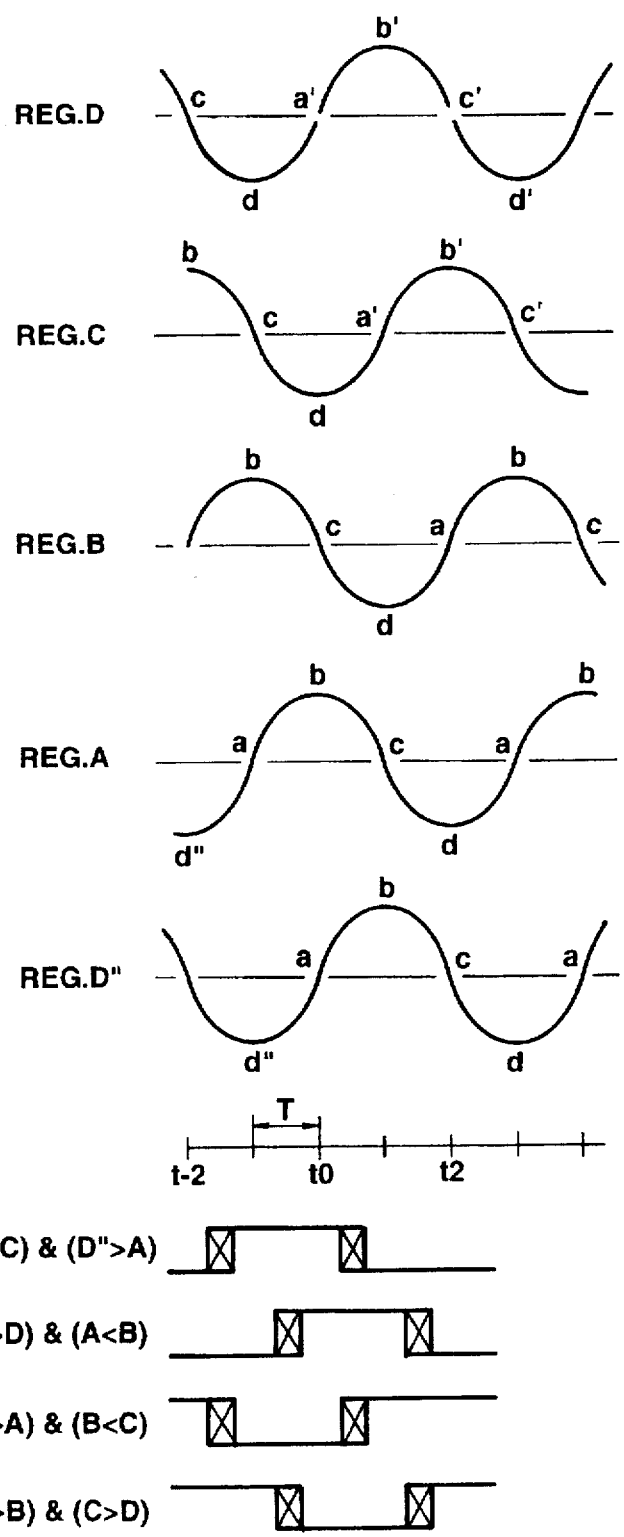
FIG. 27 is a timing chart showing respective decision signals in the pattern decision means.

The OR gate 228 takes a logical sum of the logical product outputs of the first to fourth AND gates 227A, 227B, 227C and 227D to output logical sum outputs of:

$$ptok=((B>C) \& (D"<A))$$

$$\#((C>D) \& (A<B))$$

$$\#((D>A) \& (B<C))$$

$$\#((A>B) \& (C<D))$$

where & and # denote a logical product and a logical sum, respectively, as a pattern decision signal ptok. FIG. 27 shows, in a timing chart, the respective decision signals in the pattern decision means 220.

With the pattern decision means employing the method of taking the logical sum of (1) and (4) above, pattern decision can be made in all of the sampling positions if one of (1) and (3) or one of (2) and (4) holds.

Even a signal substantially devoid of the amplitude satisfies the above condition if the signal is of the 4T periodic wave signal, such that the noise may be erroneously determined to be a reference pattern. Thus, in effect, a threshold value K for comparison of mutually neighboring signals is set for more strict decision.

Figure 28:
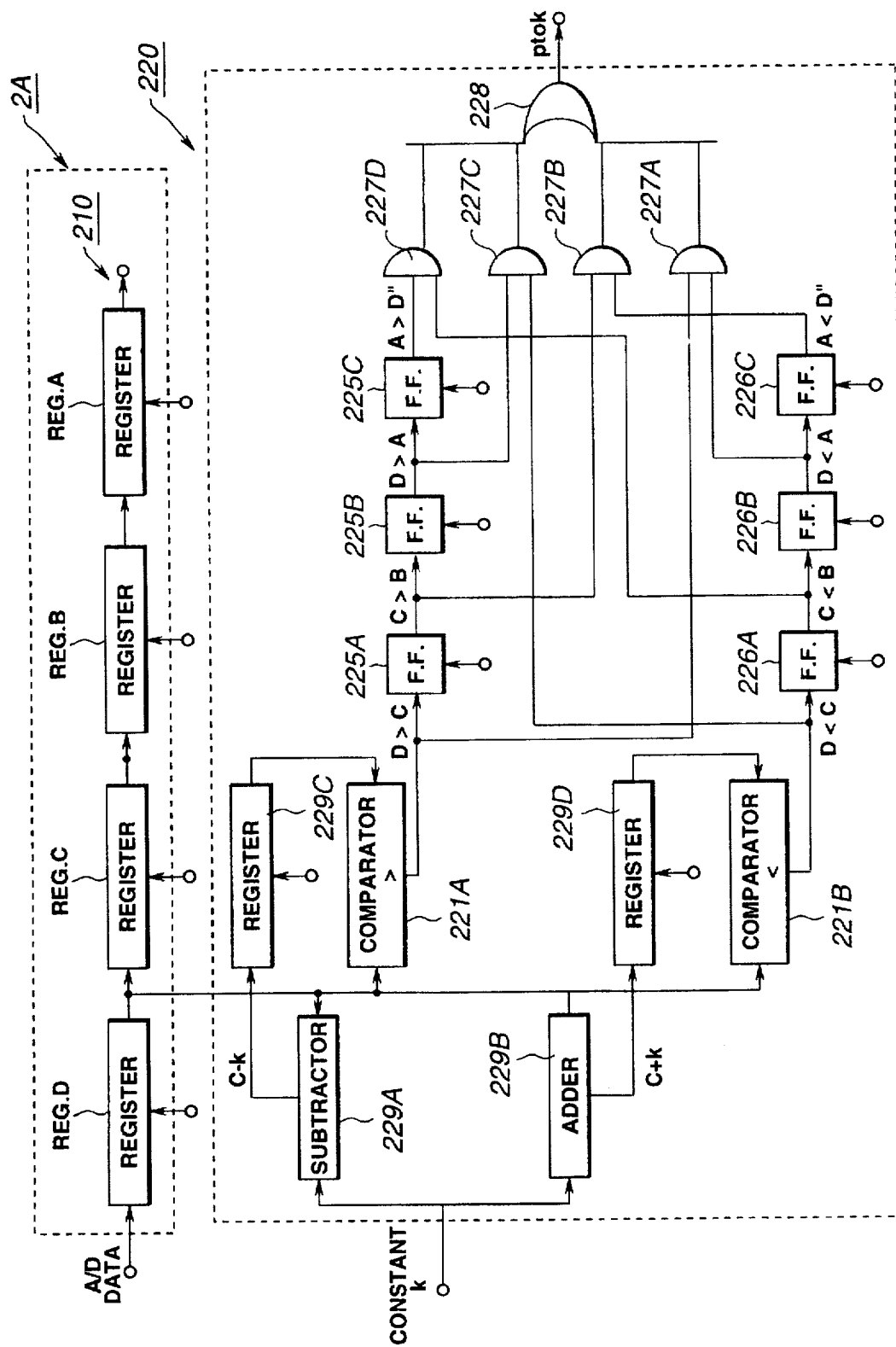
FIG. 28 is a block diagram showing still another structure of the pattern decision means.
Figure 29:
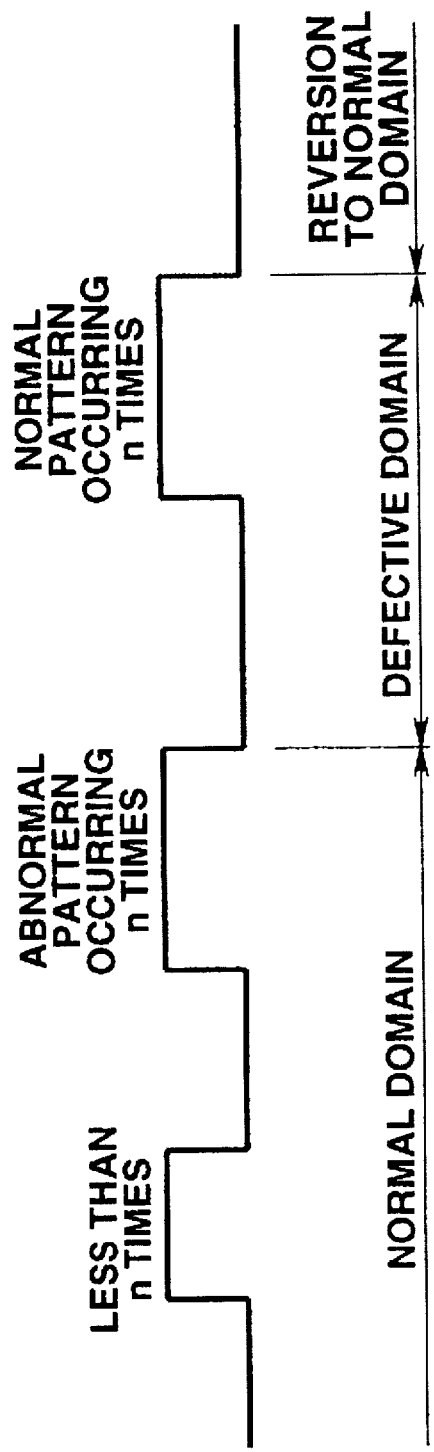
FIG. 29 is a timing chart showing defect processing by a controller of the clock generating processor.

Referring to FIG. 28 showing the configuration of the pattern decision means, the value obtained on subtracting the threshold value K from the output of REG D by the subtractor 229A or C−k is fed as an input to the first magnitude comparator 221A in the pattern decision means 220 shown in FIG. 26, while the value obtained on summing the threshold value K to the output of REG D by the adder 229B or C+K is fed as an input to the second magnitude comparator 221B via the register 229D.

In the above-described pattern decision means, the OR gate 28 takes the logical sum of logical outputs of the first to fourth AND gates 227A, 227B, 227C and 227D to output a logical sum output of:

$$ptok=((B-C>K) \& (K<A-D"))$$

$$\#((C-D>K) \& (K<B-A))$$

$$\#((D-A>K) \& (K<C-B))$$

$$\#((A-B>K) \& (K<D-C))$$

where & and # denote a logical product and a logical sum, respectively, as a pattern decision signal ptok, where $0 \leq K$.

The phase increase/decrease amount is usually set to a sufficiently small value as compared to the sampling period T even for fine seizure, such that, for rough detection, the phase increase/decrease amount is set to a fraction of the sampling period T, whereas, for fine seizure, it is set to a fraction of one-tenth of the sampling period T.

In the absence of phase increase/decrease, the playback waveform data a, b, c and d are close to a sine function, such that, if the phase increase/decrease of fine seizure is small, the playback waveform data a, b, c and d are deviated slightly from the sine function, whereas, if the phase increase/decrease of rough detection is larger, the playback waveform data a, b, c and d are deviated significantly from the sine function.

Thus, during rough detection, the threshold value K is diminished to render the pattern decision less rigid, while it is increased for fine seizure to render the pattern decision more rigid.

Since the playback signal RF of the reference area is:

$$RF=G^* \sin (2\pi/4T^*x)+0$$

the playback waveform data a, b, c and d become:

$$a=G^* \sin T+0$$

$$b=G^* \cos T+0$$

$$c=-G^* \sin T+0$$

$$d=-G^* \cos T+0$$

even granting that the phase is given to the data to a small extent.

Thus, since a+c=b+d holds, $$(a+c)-(b+d) \leq L$$

with $0 \leq L$, may be used for decision of a normal pattern.

Moreover, since a+c=b+d, a−b=d−c also holds, so that $$(a-b)^2=(d-c)^2, \text{ with}$$

$$a^2+b^2=d^2+c^2=G^2$$

and $$ab=cd.$$

Therefore, ab−cd$\leq$M, where $0 \leq M$, may be used for making decision of the normal pattern.

If the normal pattern has not been detected n times on end, that is if the abnormality has been detected n times on end, a defect is deemed to persist. If the normal pattern has been detected m times on end after defect, the normal status is deemed to have been restored.

In the above phase deviation detection, it is also possible to judge that detection of phase deviation one time on end may be deemed to be phase deviation, and to judge that detection of the normal state k times on end may be deemed to be restoration to the normal state, as in the case of the defect detection.

If the timing is approximately matched to the playback waveform, b>d holds for fine seizure, so that phase deviation decision may be made using b>d. In FIG. 21, B>D and D>B for t0 and t2, respectively.

If the result of detection fails to proceed towards an optimum phase, despite the fact that the phase setting is in the seizure direction, a defect is deemed to persist.

That is, if the limit of the seizing range is reached ad stuck to during the fine seizing operation, phase deviation is deemed to have occurred during rough detection due to erroneous operation caused by the noise. It may be contemplated that the optimum phase is at an end of the seizing range, such that, during rough detection, the detected phase is deviated from the optimum phase due to large noise to cause mistaken detection. There is also the risk that the limit of the seizing range be stuck to depending on the algorithm such that the seizing operation ceases to proceed in the correct direction.

Thus, with the present playback clock generating circuit, if it is judged that the phase deviation has occurred as described above, the operation of reverting to the rough detection is carried out in order to make rough detection from the phase limit.

What is claimed is:

1. A playback clock generating circuit for generating playback clocks used in sampling playback signals obtained from a recording medium of a sampled servo format having a reference area having a reference pattern of a pre-set period recorded therein, comprising:

phase detection means for performing rough detection based on sampled values of playback signals of the reference pattern for performing phase detection;

phase seizing means for performing fine phase seizure based on the playback signals of said reference pattern after phase detection by said phase detection means; and phase correction means for performing phase correction using an average phase during a time period of phase seizure by said phase seizing means.

2. The playback clock generating circuit as claimed in claim 1 wherein said phase correction means performs phase correction using, as a phase error, an average value of phase-seizure-unit-based average values as found over the reference area in its entirety.

3. The playback clock generating circuit as claimed in claim 2 wherein said phase correction means finds said phase error from a sum total over the entire reference area of phase-seizure-unit-based set phase values and a sum total over the entire reference area of numbers of times of the phase-seizure-unit-based setting for performing the phase correction.

4. The playback clock generating circuit as claimed in claim 2 further comprising:

means for judging defects in the playback signals of said reference pattern;

said phase correction means excluding the phase information of a defective domain, based on the result of judgment by said defect judgment means, in finding the phase error in order to perform said phase coercion.

5. The playback clock generating circuit as claimed in claim 4 wherein said phase correction means excludes the phase information of the defective domain, in terms of phase seizure units as units, based on the result of judgment by said defect judgment means, for finding the phase error in order to perform said phase coercion.

6. The playback clock generating circuit as claimed in claim 4 wherein said defect judgment means judges the playback signal of said reference pattern to be defective if pattern abnormalities persist for more than a pre-set length.

7. The playback clock generating circuit as claimed in claim 4 wherein said defect judgment means judges the playback signal of said reference pattern to be an abnormal pattern or a regular pattern depending on whether or not the playback waveform data in terms of a sampling period T as a unit can be represented by a sine wave.

8. The playback clock generating circuit as claimed in claim 6 wherein said defect judgment means judges the playback signal of said reference pattern to be an abnormal pattern or a regular pattern by judging, based on the combination of difference comparison operations of the playback waveform data in terms of the sampling period T asa unit, whether or not monotonous increase and monotonous decrease occur iteratively.

9. The playback clock generating circuit as claimed in claim 8 wherein said defect judgment means excludes judgment at extreme values in judging the playback signal of said reference pattern to be an abnormal pattern or a regular pattern by judging, based on the combination of difference comparison operations of the playback waveform data in terms of the sampling period T asa unit, whether or not monotonous increase and monotonous decrease occur iteratively.

10. The playback clock generating circuit as claimed in claim 9 wherein said defect judgment means sets a threshold value to perform difference comparison of playback waveform data in terms of a sampling period T as a unit in order to judge whether or not monotonous increase and monotonous decrease occur iteratively.

11. The playback clock generating circuit as claimed in claim 10 wherein said defect judgment means sets, at the time of fine phase seizure by said phase seizure means, a threshold value smaller than a threshold value at the time of rough phase detection by said phase detection means in performing difference comparison of the playback waveform data in terms of the sampling period T as a unit.

12. The playback clock generating circuit as claimed in claim 7 wherein
   said defect judgment means uses, for judgment of the regular pattern, a judgment condition:

$$(a+c)-(b+d) \leq L$$

where a, b, c and d are playback waveform data in terms of the sampling period T as a unit, with $0 \leq L$.

13. The playback clock generating circuit as claimed in claim 7 wherein
   said defect judgment means uses, for judgment of the regular pattern, a judgment condition:

$$ab-cd \leq M$$

where a, b, c and d are playback waveform data in terms of the sampling period T as a unit, with $0 \leq M$.

14. The playback clock generating circuit as claimed in claim 4 wherein
   said defect judgment means deems the playback signals of said reference pattern to be defective if a regular pattern cannot be detected n times on end, said defect judgment means deeming detection of the regular pattern m times on end after defect occurrence to be restoration to a regular state.

15. The playback clock generating circuit as claimed in claim 1 further comprising:
   abnormality detection means for detecting an abnormality of the payback signal of said reference pattern; and
   control means for controlling the phase seizure operation by said phase seizure means responsive to an abnormality detection signal by said abnormality detection means.

16. The playback clock generating circuit as claimed in claim 15 wherein
   said control means performs control of stopping the phase seizure operation by said phase seizure means in a defective domain of the playback signal of said reference pattern based on the abnormality detection signal by said abnormality detection means.

17. The playback clock generating circuit as claimed in claim 15 wherein
   said control means performs control of restoring the phase seizure operation by said phase seizure means in the defective domain of the playback signal of said reference pattern to a pre-defect phase based on the abnormality detection signal by said abnormality detection means.

18. The playback clock generating circuit as claimed in claim 15 wherein
   said control means performs control of restoring the phase seizure operation by said phase seizure means in the defective domain of the playback signal of said reference pattern to a pre-defect phase based on the abnormality detection signal by said abnormality detection means.

19. The playback clock generating circuit as claimed in claim 1 further comprising:
   control means for performing control of interrupting fine phase seizure to revert to rough detection by said phase detection means if, during fine phase seizure by said phase seizing means, phase deviation is detected by the playback signal of said reference pattern.

20. The playback clock generating circuit as claimed in claim 19 wherein, if, during fine phase seizure by said phase seizing means, the defect judgment means performing defect judgment by judging the playback signal of said reference pattern to be an abnormal pattern or a regular pattern depending on whether or not the playback waveform data in terms of a sampling period T as a unit can be represented by a sine wave judges the playback signal of the reference pattern to be defective, said control means deems that phase deviation has occurred and performs control of interrupting fine phase seizure to revert to rough detection by said phase detection means.

21. The playback clock generating circuit as claimed in claim 20 wherein
   said defect judgment means judges the playback signal of said reference pattern to be an abnormal pattern or a regular pattern by judging, based on the combination of difference comparison operations of the playback waveform data in terms of the sampling period T as a unit, whether or not monotonous increase and monotonous decrease occur iteratively.

22. The playback clock generating circuit as claimed in claim 21 wherein
   said defect judgment means excludes judgment at extreme values in judging the playback signal of said reference pattern to be an abnormal pattern or a regular pattern by judging, based on the combination of difference comparison operations of the playback waveform data in terms of the sampling period T as a unit, whether or not monotonous increase and monotonous decrease occur iteratively.

23. The playback clock generating circuit as claimed in claim 19 wherein
   said defect judgment means judges the playback signal of the reference pattern to be an abnormal pattern or a normal pattern using $$b > d$$

as a condition of judgment of a regular pattern, where a, b, c and d are playback waveform data in terms of the sampling period T as a unit.

24. The playback clock generating circuit as claimed in claim 19 further comprising:
   control means for performing control for reversion to rough detection by said phase detection means if the result of detection does not proceed in a direction towards an optimum phase despite the fact that, during fine phase seizure by said phase seizure means, the set phase is set to the seizure direction.

25. A method for detecting a defect in a playback reference pattern signal in a playback clock generating circuit for generating playback clocks used in sampling playback signals obtained from a recording medium of a sampled servo format having a reference area having a reference pattern of a pre-set period recorded therein, by performing fine phase seizure after phase detection by rough detection based on a sampled value of a playback reference pattern signal, and by performing phase correction using an average phase during the seizure period for said fine phase seizure, wherein
   the playback signal of the reference pattern is judged to be defective if pattern abnormality persists for more than a pre-set length.

26. The method for detecting a defect in a playback reference pattern signal in a playback clock generating circuit as claimed in claim 25 wherein
   the playback signal of said reference pattern is judged to be an abnormal pattern or a regular pattern depending on whether or not the playback waveform data in terms of a sampling period T as a unit can be represented by a sine wave.

27. The method for detecting a defect in a playback reference pattern signal in a playback clock generating circuit as claimed in claim 26 wherein the playback signal of said reference pattern is judged to be an abnormal pattern or a regular pattern by judging, based on the combination of difference comparison operations of the playback waveform data in terms of the sampling period T as a unit, whether or not monotonous increase and monotonous decrease occur iteratively.

28. The method for detecting a defect in a playback reference pattern signal in a playback clock generating circuit as claimed in claim 27 wherein judgment at extreme values is excluded in judging the playback signal of said reference pattern to be an abnormal pattern or a regular pattern by judging, based on the combination of difference comparison operations of the playback waveform data in terms of the sampling period T asa unit, whether or not monotonous increase and monotonous decrease occur iteratively.

29. The method for detecting a defect in a playback reference pattern signal in a playback clock generating circuit as claimed in claim 28 wherein a threshold value is set in order to perform difference comparison of playback waveform data in terms of a sampling period T as a unit in order to judge whether or not monotonous increase and monotonous decrease occur iteratively.

30. The method for detecting a defect in a playback reference pattern signal in a playback clock generating circuit as claimed in claim 29 wherein, at the time of fine phase seizure by said phase seizure means, a threshold value smaller than a threshold value at the time of rough phase detection by said phase detection means is set in performing difference comparison of the playback waveform data in terms of the sampling period T as a unit.

31. The method for detecting a defect in a playback reference pattern signal in a playback clock generating circuit as claimed in claim 26 wherein, for judgment of the regular pattern, a judgment condition:

$$(a+c)-(b+d) \leq L$$

is used, where a, b, c and d are playback waveform data in terms of the sampling period T as a unit, with $0 \leq L$.

32. The method for detecting a defect in a playback reference pattern signal in a playback clock generating circuit as claimed in claim 26 wherein, for judgment of the regular pattern, a judgment condition:

$$ab-cd \leq M$$

is used, where a, b, c and d are playback waveform data in terms of the sampling period T as a unit, with $0 \leq M$.

33. The method for detecting a defect in a playback reference pattern signal in a playback clock generating circuit as claimed in claim 25 wherein the playback signals of said reference pattern are deemed to be defective if a regular pattern cannot be detected n times on end, and wherein detection of the regular pattern m times on end after defect occurrence is deemed to be restoration to a regular state.

* * * * *